(12) United States Patent
Turner

(10) Patent No.: US 12,155,973 B2
(45) Date of Patent: *Nov. 26, 2024

(54) PIPELINE INSPECTION DEVICE WITH ENHANCED IMAGE CONTROL

(71) Applicant: MILWAUKEE ELECTRIC TOOL CORPORATION, Brookfield, WI (US)

(72) Inventor: Christopher J. Turner, Lannon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,122

(22) Filed: May 22, 2023

(65) Prior Publication Data
US 2023/0300299 A1 Sep. 21, 2023

Related U.S. Application Data

(63) Continuation of application No. 17/173,347, filed on Feb. 11, 2021, now Pat. No. 11,659,142.
(Continued)

(51) Int. Cl.
*H04N 7/18* (2006.01)
*F16L 55/26* (2006.01)
(Continued)

(52) U.S. Cl.
CPC .............. *H04N 7/183* (2013.01); *F16L 55/26* (2013.01); *F16L 55/46* (2013.01); *H04N 23/62* (2023.01);
(Continued)

(58) Field of Classification Search
CPC ........ H04N 7/183; H04N 23/80; H04N 23/62; H04N 23/555; F16L 55/26; F16L 55/46; F16L 2101/30
(Continued)

(56) References Cited

U.S. PATENT DOCUMENTS 2,301,104 A 11/1942 Lloyd
D196,100 S 8/1963 O'Neill
(Continued)

FOREIGN PATENT DOCUMENTS

DE 202005002976 U1 8/2005
EP 0987541 A1 3/2000
(Continued)

OTHER PUBLICATIONS

Gen-Eye Prism Video Pipe Inspection System, <https://drainbrain.com/products/gen-eye-prism/> website available as early as Dec. 14, 2017.
(Continued)

*Primary Examiner* — Allen C Wong
(74) *Attorney, Agent, or Firm* — Michael Best & Friedrich LLP

(57) ABSTRACT

A pipeline inspection system may include a cable that may be configured to be directed into a conduit. The pipeline inspection system may further include a camera disposed on a distal end of the cable and operable to capture an image. The pipeline inspection system may further include a monitor including a display configured to display an image. The pipeline inspection system may further include an electronic processor that may be configured to receive a user input indicating a characteristic of the conduit. The electronic processor may be further configured to determine an image setting of the display based on the characteristic of the conduit. The electronic processor may be further configured to control the monitor to display the image on the display according to the image setting.

23 Claims, 28 Drawing Sheets

Related U.S. Application Data

(60) Provisional application No. 62/975,250, filed on Feb. 12, 2020.

(51) Int. Cl.
  *F16L 55/46* (2006.01)
  *H04N 23/62* (2023.01)
  *H04N 23/80* (2023.01)
  *F16L 101/30* (2006.01)
  *H04N 23/50* (2023.01)

(52) U.S. Cl.
  CPC .......... *H04N 23/80* (2023.01); *F16L 2101/30* (2013.01); *H04N 23/555* (2023.01)

(58) Field of Classification Search
  USPC .......................................................... 348/84
  See application file for complete search history.

(56) References Cited

U.S. PATENT DOCUMENTS

| | | |
|---|---|---|
| 3,400,230 A | 9/1968 | Becker et al. |
| 3,976,260 A | 8/1976 | Irik |
| D257,576 S | 12/1980 | Bobrovniczky |
| 4,255,762 A | 3/1981 | Takeyasu et al. |
| D260,985 S | 9/1981 | Moylan |
| 4,576,097 A | 3/1986 | Foster |
| 4,611,360 A | 9/1986 | Irwin |
| D286,134 S | 10/1986 | Schwartz |
| D286,503 S | 11/1986 | Bobrovniczky |
| 4,725,883 A | 2/1988 | Clark, Jr. et al. |
| 4,913,558 A | 4/1990 | Wettervik et al. |
| 4,974,168 A | 11/1990 | Marx |
| 4,987,584 A | 1/1991 | Doenges |
| 5,014,925 A | 5/1991 | Cump |
| 5,309,595 A | 5/1994 | Salecker et al. |
| 5,649,674 A | 7/1997 | Ciekler |
| 5,754,220 A | 5/1998 | Smalser, Sr. |
| 6,457,669 B1 | 10/2002 | Chuang |
| 6,545,704 B1 | 4/2003 | Olsson et al. |
| D475,277 S | 6/2003 | Wu |
| 6,697,102 B1 | 2/2004 | Olsson et al. |
| 6,831,679 B1 | 12/2004 | Olsson et al. |
| 6,846,285 B2 | 1/2005 | Hasegawa et al. |
| 6,862,945 B2 | 3/2005 | Chapman et al. |
| 6,889,701 B2 | 5/2005 | Kovacik et al. |
| 6,908,310 B1 | 6/2005 | Olsson et al. |
| 6,931,149 B2 | 8/2005 | Hagene et al. |
| 6,958,767 B2 | 10/2005 | Olsson et al. |
| 7,009,399 B2 | 3/2006 | Olsson et al. |
| 7,044,623 B2 | 5/2006 | Olsson et al. |
| 7,104,951 B2 | 9/2006 | Hasegawa et al. |
| 7,136,765 B2 | 11/2006 | Maier et al. |
| 7,164,476 B2 | 1/2007 | Shima et al. |
| 7,221,136 B2 | 5/2007 | Olsson et al. |
| 7,298,126 B1 | 11/2007 | Olsson et al. |
| 7,332,901 B2 | 2/2008 | Olsson et al. |
| 7,336,078 B1 | 2/2008 | Merewether et al. |
| 7,359,611 B1 | 4/2008 | Kaplan |
| 7,443,154 B1 | 10/2008 | Merewether et al. |
| D580,857 S | 11/2008 | Matthew et al. |
| 7,498,797 B1 | 3/2009 | Olsson et al. |
| 7,498,816 B1 | 3/2009 | Olsson et al. |
| 7,518,374 B1 | 4/2009 | Olsson et al. |
| 7,551,197 B2 | 6/2009 | Penza et al. |
| 7,557,559 B1 | 7/2009 | Olsson et al. |
| D604,244 S | 11/2009 | Kovacik et al. |
| 7,619,516 B2 | 11/2009 | Olsson et al. |
| 7,676,879 B1 | 3/2010 | Rutenberg et al. |
| 7,715,701 B2 | 5/2010 | Lange |
| 7,733,077 B1 | 6/2010 | Merewether et al. |
| 7,741,848 B1 | 6/2010 | Olsson et al. |
| 7,825,647 B2 | 11/2010 | Olsson et al. |
| 7,830,149 B1 | 11/2010 | Olsson et al. |
| 7,863,885 B1 | 1/2011 | Olsson et al. |
| D636,253 S | 4/2011 | Hatcher et al. |
| 7,948,236 B1 | 5/2011 | Olsson et al. |
| 7,990,151 B2 | 8/2011 | Olsson et al. |
| 8,013,610 B1 | 9/2011 | Merewether et al. |
| 8,033,677 B1 | 10/2011 | Olsson et al. |
| 8,035,390 B2 | 10/2011 | Olsson et al. |
| 8,074,916 B2 | 12/2011 | Penumatcha et al. |
| 8,106,660 B1 | 1/2012 | Merewether et al. |
| 8,167,468 B1 | 5/2012 | Olsson et al. |
| 8,172,434 B1 | 5/2012 | Olsson |
| 8,176,593 B2 | 5/2012 | Gress et al. |
| 8,203,343 B1 | 6/2012 | Olsson et al. |
| 8,248,056 B1 | 8/2012 | Olsson et al. |
| 8,264,226 B1 | 9/2012 | Olsson et al. |
| 8,279,278 B2 | 10/2012 | Park et al. |
| 8,289,385 B2 | 10/2012 | Olsson et al. |
| 8,395,661 B1 | 3/2013 | Olsson et al. |
| 8,400,154 B1 | 3/2013 | Olsson et al. |
| 8,413,347 B2 | 4/2013 | Gress et al. |
| 8,540,429 B1 | 9/2013 | Olsson et al. |
| 8,547,428 B1 | 10/2013 | Olsson et al. |
| 8,564,295 B2 | 10/2013 | Olsson et al. |
| 8,587,648 B2 | 11/2013 | Olsson et al. |
| 8,616,725 B2 | 12/2013 | Olsson et al. |
| 8,616,734 B2 | 12/2013 | Olsson |
| 8,632,230 B2 | 1/2014 | Olsson et al. |
| 8,635,043 B1 | 1/2014 | Olsson et al. |
| 8,717,028 B1 | 5/2014 | Merewether et al. |
| 8,773,133 B1 | 7/2014 | Olsson et al. |
| 8,864,326 B2 | 10/2014 | Armer et al. |
| 8,908,027 B2 | 12/2014 | Kleyn et al. |
| 8,931,131 B1 | 1/2015 | Feduke |
| 8,970,211 B1 | 3/2015 | Olsson et al. |
| 8,984,698 B1 | 3/2015 | Olsson |
| 9,019,364 B2 | 4/2015 | Brignac et al. |
| 9,041,794 B1 | 5/2015 | Olsson et al. |
| 9,057,754 B2 | 6/2015 | Olsson et al. |
| 9,080,992 B2 | 7/2015 | Olsson et al. |
| 9,081,109 B1 | 7/2015 | Olsson et al. |
| 9,082,269 B2 | 7/2015 | Olsson et al. |
| 9,091,416 B1 | 7/2015 | Olsson et al. |
| 9,151,484 B1 | 7/2015 | Olsson et al. |
| 9,134,255 B1 | 9/2015 | Olsson et al. |
| 9,134,817 B2 | 9/2015 | Olsson |
| 9,143,740 B2 | 9/2015 | Hansen et al. |
| 9,207,350 B2 | 12/2015 | Olsson et al. |
| 9,222,809 B1 | 12/2015 | Olsson et al. |
| 9,234,812 B2 | 1/2016 | Krywyj |
| 9,239,512 B2 | 1/2016 | Foss et al. |
| 9,277,105 B2 | 3/2016 | Olsson et al. |
| 9,285,109 B1 | 3/2016 | Olsson et al. |
| 9,304,055 B2 | 4/2016 | Hansen et al. |
| 9,316,387 B1 | 4/2016 | Olsson et al. |
| D755,726 S | 5/2016 | Michas |
| 9,341,740 B1 | 5/2016 | Olsson et al. |
| 9,372,117 B2 | 6/2016 | Olsson et al. |
| 9,388,973 B1 | 7/2016 | Olsson et al. |
| 9,411,066 B1 | 8/2016 | Olsson et al. |
| 9,411,067 B2 | 8/2016 | Olsson et al. |
| 9,416,957 B2 | 8/2016 | Olsson et al. |
| 9,429,301 B2 | 8/2016 | Olsson et al. |
| 9,435,907 B2 | 9/2016 | Olsson et al. |
| 9,448,376 B2 | 9/2016 | Chapman et al. |
| 9,465,129 B1 | 10/2016 | Olsson et al. |
| 9,468,954 B1 | 10/2016 | Olsson et al. |
| 9,477,147 B2 | 10/2016 | Chapman et al. |
| 9,488,747 B2 | 11/2016 | Olsson et al. |
| 9,494,706 B2 | 11/2016 | Olsson et al. |
| 9,506,628 B1 | 11/2016 | Merewether et al. |
| 9,512,988 B2 | 12/2016 | Olsson et al. |
| 9,521,303 B2 | 12/2016 | Olsson et al. |
| 9,523,788 B1 | 12/2016 | Olsson et al. |
| 9,571,326 B2 | 2/2017 | Bench et al. |
| 9,574,760 B1 | 2/2017 | Olsson et al. |
| 9,599,740 B2 | 3/2017 | Olsson |
| 9,625,602 B2 | 4/2017 | Olsson |
| 9,632,202 B2 | 4/2017 | Olsson et al. |
| 9,634,878 B1 | 4/2017 | Bench et al. |
| 9,638,824 B2 | 5/2017 | Olsson et al. |

(56) References Cited

U.S. PATENT DOCUMENTS

| | | | |
|---|---|---|---|
| 9,684,090 B1 | 6/2017 | Olsson et al. |
| 9,695,008 B2 | 7/2017 | Thakare et al. |
| 9,696,447 B1 | 7/2017 | Olsson et al. |
| 9,696,448 B2 | 7/2017 | Olsson et al. |
| 9,703,002 B1 | 7/2017 | Olsson et al. |
| 9,746,170 B1 | 8/2017 | Armer et al. |
| 9,746,572 B2 | 8/2017 | Olsson et al. |
| 9,746,573 B1 | 8/2017 | Olsson et al. |
| 9,769,366 B2 | 9/2017 | Olsson et al. |
| 9,784,837 B1 | 10/2017 | Olsson et al. |
| 9,791,382 B2 | 10/2017 | Olsson et al. |
| 9,798,033 B2 | 10/2017 | Olsson et al. |
| 9,824,433 B2 | 11/2017 | Olsson et al. |
| 9,829,783 B1 | 11/2017 | Chapman et al. |
| 9,835,564 B2 | 12/2017 | Olsson et al. |
| 9,841,503 B2 | 12/2017 | Olsson et al. |
| 9,863,590 B2 | 1/2018 | Olsson et al. |
| 9,880,309 B2 | 1/2018 | Merewether et al. |
| 9,891,337 B2 | 2/2018 | Olsson et al. |
| 9,924,139 B2 | 3/2018 | Olsson et al. |
| 9,927,368 B1 | 3/2018 | Olsson et al. |
| 9,927,545 B2 | 3/2018 | Olsson et al. |
| 9,927,546 B2 | 3/2018 | Olsson et al. |
| 9,928,613 B2 | 3/2018 | Olsson et al. |
| D815,049 S | 4/2018 | Temblador et al. |
| 9,945,976 B2 | 4/2018 | Olsson et al. |
| 9,989,662 B1 | 6/2018 | Olsson et al. |
| 10,001,425 B1 | 6/2018 | Olsson et al. |
| 10,009,519 B2 | 6/2018 | Olsson et al. |
| 10,009,582 B2 | 6/2018 | Olsson et al. |
| 10,024,366 B2 | 7/2018 | Kleyn et al. |
| 10,024,994 B1 | 7/2018 | Cox et al. |
| 10,031,253 B2 | 7/2018 | Olsson et al. |
| D836,560 S | 12/2018 | Temblador et al. |
| 10,364,125 B2 | 7/2019 | Blair et al. |
| 10,434,547 B2 | 10/2019 | Turner et al. |
| 11,052,809 B2 | 7/2021 | Weber et al. |
| 11,059,695 B2 | 7/2021 | Zahnd et al. |
| 11,248,982 B2 | 2/2022 | Krohlow et al. |
| 2002/0032365 A1 | 3/2002 | Hasegawa et al. |
| 2002/0113870 A1 | 8/2002 | Mueckl et al. |
| 2002/0154811 A1 | 10/2002 | Katsuta et al. |
| 2003/0052967 A1 | 3/2003 | Brunton |
| 2004/0054259 A1 | 3/2004 | Hasegawa et al. |
| 2005/0193509 A1 | 9/2005 | Rutkowski et al. |
| 2005/0275725 A1 | 12/2005 | Olsson et al. |
| 2006/0195994 A1 | 9/2006 | Hung |
| 2007/0132842 A1 | 6/2007 | Morris |
| 2007/0297778 A1 | 12/2007 | Lange |
| 2008/0098544 A1 | 5/2008 | Rutkowski et al. |
| 2008/0229527 A1 | 9/2008 | Berry |
| 2009/0292502 A1 | 11/2009 | Gress et al. |
| 2010/0127922 A1 | 5/2010 | Sooy |
| 2010/0208056 A1 | 8/2010 | Olsson et al. |
| 2011/0098941 A1* | 4/2011 | Duckworth ......... G01M 5/0033 |
| | | 702/38 |
| 2011/0109437 A1 | 5/2011 | Olsson |
| 2012/0069172 A1 | 3/2012 | Hudritsch |
| 2012/0147173 A1 | 6/2012 | Lynch |
| 2012/0203501 A1 | 8/2012 | Gress et al. |
| 2012/0206501 A1 | 8/2012 | Gress et al. |
| 2012/0211580 A1 | 8/2012 | Kleyn et al. |
| 2012/0242341 A1 | 9/2012 | Olsson et al. |
| 2013/0164567 A1 | 6/2013 | Olsson et al. |
| 2013/0214786 A1 | 8/2013 | Hansen et al. |
| 2013/0218485 A1 | 8/2013 | Hansen et al. |
| 2013/0235271 A1* | 9/2013 | Kasuga ............... H04N 21/4854 |
| | | 348/569 |
| 2014/0111376 A1 | 2/2014 | Bench et al. |
| 2014/0152802 A1 | 6/2014 | Olsson et al. |
| 2014/0154535 A1 | 6/2014 | Olsson et al. |
| 2014/0159729 A1 | 6/2014 | Olsson et al. |
| 2014/0167766 A1 | 6/2014 | Olsson et al. |
| 2014/0168407 A1 | 6/2014 | Olsson et al. |
| 2014/0176696 A1 | 6/2014 | Chapman et al. |
| 2014/0204197 A1 | 7/2014 | Olsson et al. |
| 2014/0210989 A1 | 7/2014 | Olsson et al. |
| 2014/0313316 A1 | 10/2014 | Olsson et al. |
| 2014/0313321 A1 | 10/2014 | Olsson et al. |
| 2015/0055005 A1 | 2/2015 | Olsson et al. |
| 2015/0077120 A1 | 3/2015 | Olsson et al. |
| 2015/0101896 A1 | 4/2015 | Kleyn et al. |
| 2015/0263434 A1 | 9/2015 | Bench et al. |
| 2015/0263469 A1 | 9/2015 | Olsson |
| 2015/0350506 A1 | 12/2015 | Olsson et al. |
| 2015/0355363 A1 | 12/2015 | Merewether et al. |
| 2016/0141766 A1 | 5/2016 | Olsson et al. |
| 2016/0173829 A1 | 6/2016 | Olsson et al. |
| 2016/0187522 A1 | 6/2016 | Olsson et al. |
| 2016/0261829 A1 | 9/2016 | Olsson et al. |
| 2016/0373619 A1 | 12/2016 | Olsson et al. |
| 2017/0015490 A1 | 1/2017 | Olsson et al. |
| 2017/0017010 A1 | 1/2017 | Olsson et al. |
| 2017/0023492 A1 | 1/2017 | Olsson et al. |
| 2017/0024872 A1 | 1/2017 | Olsson et al. |
| 2017/0115424 A1 | 4/2017 | Olsson et al. |
| 2017/0128989 A1 | 5/2017 | Olsson et al. |
| 2017/0130950 A1 | 5/2017 | Olsson et al. |
| 2017/0131422 A1 | 5/2017 | Olsson et al. |
| 2017/0131423 A1 | 5/2017 | Olsson et al. |
| 2017/0131424 A1 | 5/2017 | Olsson |
| 2017/0134693 A1 | 5/2017 | Chapman et al. |
| 2017/0160420 A1 | 6/2017 | Olsson et al. |
| 2017/0163940 A1 | 6/2017 | Olsson et al. |
| 2017/0176344 A9 | 6/2017 | Olsson et al. |
| 2017/0191651 A1 | 7/2017 | Merewether et al. |
| 2017/0200352 A1 | 7/2017 | Olsson et al. |
| 2017/0235010 A1 | 8/2017 | Olsson et al. |
| 2017/0261196 A1 | 9/2017 | Chapman et al. |
| 2017/0261630 A1 | 9/2017 | Olsson et al. |
| 2017/0299757 A1 | 10/2017 | Bench et al. |
| 2017/0307670 A1 | 10/2017 | Olsson |
| 2017/0363764 A1 | 12/2017 | Aldridge et al. |
| 2018/0022535 A9 | 1/2018 | Olsson et al. |
| 2018/0038093 A1 | 2/2018 | Olsson et al. |
| 2018/0085696 A1 | 3/2018 | Morris et al. |
| 2018/0128931 A1 | 5/2018 | Olsson et al. |
| 2018/0165924 A9 | 6/2018 | Olsson et al. |
| 2018/0169719 A1* | 6/2018 | Turner ..................... E03F 7/12 |
| 2018/0202940 A1 | 7/2018 | Olsson et al. |
| 2018/0231208 A1 | 8/2018 | Chapman et al. |
| 2019/0346330 A1 | 11/2019 | Krohlow et al. |
| 2021/0164601 A1 | 6/2021 | Warren et al. |
| 2021/0250551 A1 | 8/2021 | Turner |
| 2021/0354178 A1 | 11/2021 | Turner et al. |
| 2022/0085592 A1 | 3/2022 | Olsson et al. |
| 2022/0268393 A1 | 8/2022 | Moreau et al. |

FOREIGN PATENT DOCUMENTS

| | | |
|---|---|---|
| EP | 1296131 A2 | 3/2003 |
| EP | 2313211 B1 | 9/2015 |
| JP | 2010096718 A | 4/2010 |
| WO | 0107954 A1 | 2/2001 |
| WO | 2003025536 A2 | 3/2003 |
| WO | 2006078873 A9 | 1/2009 |
| WO | 2012168736 A1 | 12/2012 |
| WO | 2012178205 A2 | 12/2012 |
| WO | 2013074705 A2 | 5/2013 |
| WO | 2013148714 A2 | 10/2013 |
| WO | 2014145778 A1 | 9/2014 |
| WO | 2015031407 A1 | 3/2015 |
| WO | 2016003938 A1 | 1/2016 |
| WO | 2018112476 A1 | 6/2018 |
| WO | 2018129549 A1 | 7/2018 |
| WO | 2018132772 A1 | 7/2018 |

OTHER PUBLICATIONS

Youtube, "How to connect mobile devices to Gen-Eye Wi-Fi—Version 2.0," <https://www.youtube.com/watch?v=YKncdIIQLA8> published Sep. 12, 2016.

(56) References Cited

OTHER PUBLICATIONS

International Search Report and Written Opinion for Application No. PCT/US2021/017533 dated Apr. 27, 2021 (11 pages).

* cited by examiner

PIPELINE INSPECTION DEVICE WITH ENHANCED IMAGE CONTROL

RELATED APPLICATIONS

This application is a continuation of U.S. patent application Ser. No. 17/173,347 filed Feb. 11, 2021, now U.S. Pat. No. 11,659,142, which claims priority to U.S. Provisional Patent Application No. 62/975,250 filed Feb. 12, 2020, the entire content of each of which is hereby incorporated by reference.

FIELD OF DISCLOSURE

The present disclosure relates to sewer inspection devices for inspecting sewers, drains, pipes, or other conduits.

BACKGROUND

Pipeline inspection devices can be used to determine the location of obstructions in underground pipes or find damaged areas that affect the integrity of pipe systems. Generally, a pipeline inspection device includes a cable that can be pushed down a length of the pipe. The end of the cable may include an imaging device, such as a video camera, to help identify an obstruction or damage within the pipe. The end of the cable may also include a location device, such as a sonde, to transmit the location of the end of the cable. The location device allows a user to find the end of the cable and dig down towards the pipe at the proper location where the obstruction might be.

SUMMARY

One embodiment includes a pipeline inspection system that may include a cable configured to be directed into a conduit. The pipeline inspection system may further include a camera disposed on a distal end of the cable and operable to capture an image. The pipeline inspection system may further include a monitor including a display. The monitor may be configured to display the image on the display. The pipeline inspection system may further include an electronic processor communicatively coupled to the camera and to the monitor. The electronic processor may be configured to receive a user input indicating a characteristic of the conduit. The electronic processor may be further configured to determine an image setting of the display based on the characteristic of the conduit. The electronic processor may be further configured to control the monitor to display the image on the display according to the image setting.

Another embodiment includes a method of displaying an image. The method may include receiving, with an electronic processor of a pipeline inspection system, a user input indicating a characteristic of a conduit into which a cable is configured to be directed. The cable may include a camera disposed on a distal end of the cable. The camera may be operable to capture the image. The electronic processor may be communicatively coupled to the camera and to a monitor including a display. The monitor may be configured to display the image on the display. The method may further include determining, with the electronic processor, an image setting of the display based on the characteristic of the conduit. The method may further include capturing, with the camera, the image. The method may further include controlling, with the electronic processor, the monitor to display the image on the display according to the image setting.

Another embodiment includes a pipeline inspection system that may include a drum defining an interior. The pipeline inspection system may further include a cable received within the interior of the drum and configured to be directed into a conduit. The pipeline inspection system may further include a camera disposed on a distal end of the cable and operable to capture an image. The pipeline inspection system may further include a monitor including a display. The monitor may be configured to display the image on the display. The pipeline inspection system may further include an electronic processor communicatively coupled to the camera and to the monitor. The electronic processor may be configured to control the monitor to display an indication of a value of each of a plurality of image settings according to which the image is displayed on the display. The electronic processor may be further configured to receive a user input. The electronic processor may be further configured to adjust a value of at least two image settings of the plurality of image settings to an adjusted value based on the user input. The electronic processor may be further configured to control the monitor to display the image on the display according to the adjusted values.

Another embodiment includes a monitor for use with a pipeline inspection system. The monitor may include a display configured to display an image captured by a camera disposed on a distal end of a cable configured to be directed into a conduit. The monitor may also include an electronic processor communicatively coupled to the display. The electronic processor may be configured to receive a user input indicating a characteristic of the conduit. The electronic processor may be further configured to determine an image setting of the display based on the characteristic of the conduit. The electronic processor may be further configured to control the monitor to display the image on the display according to the image setting.

Other aspects of the disclosure will become apparent by consideration of the detailed description and accompanying drawings.

Figure 1:
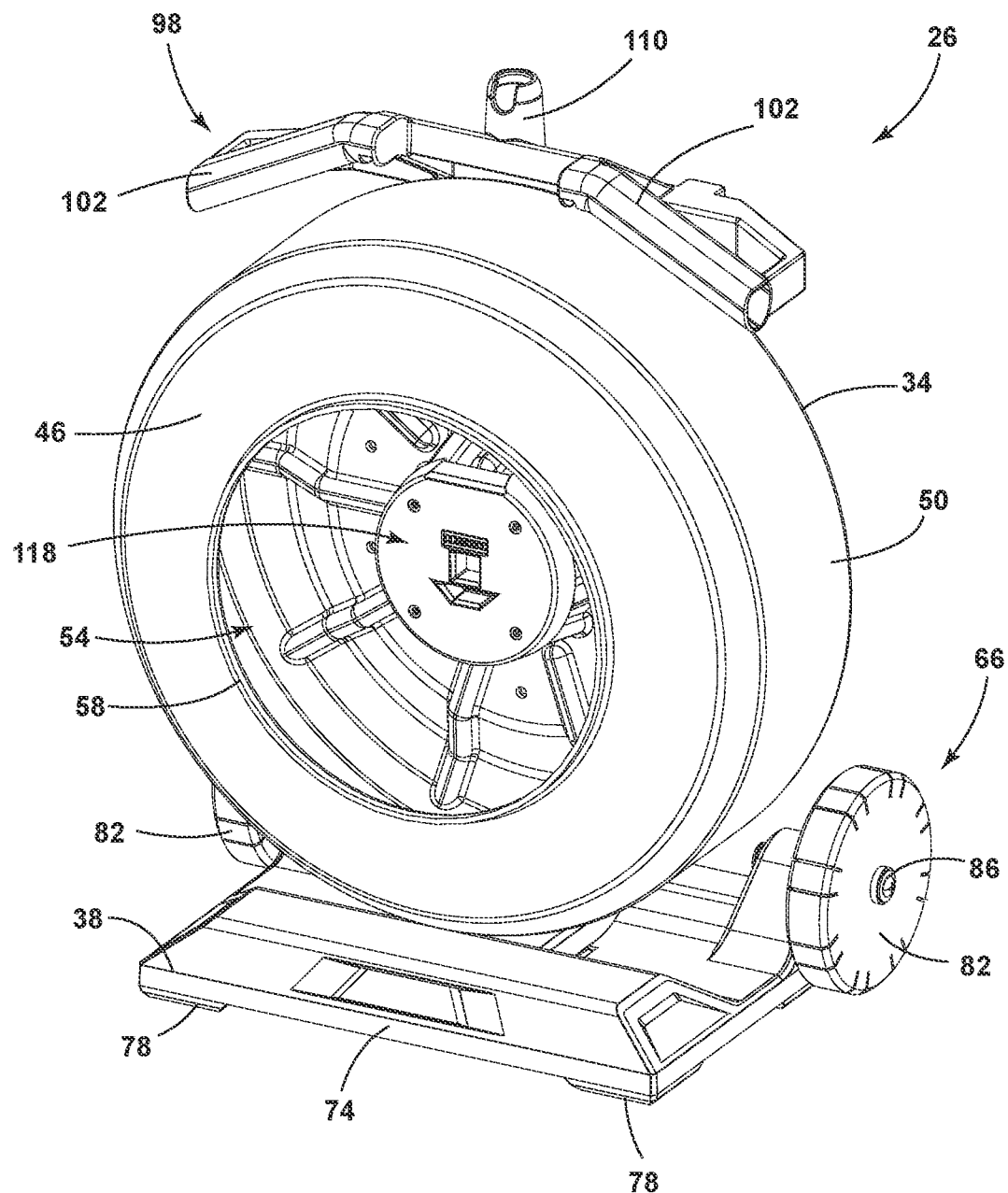
FIG. 1 is a front perspective view of a reel for use in a pipeline inspection device according to a first embodiment.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement embodiments of the disclosure. Furthermore, and as described in subsequent paragraphs, the specific configurations illustrated in the drawings are intended to exemplify embodiments of the disclosure and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Throughout this application, the term "approximately" is used to describe the dimensions of various components. In some situations, the term "approximately" means that the described dimension is within 1% of the stated value, within 5% of the stated value, within 10% of the stated value, or the like. When the term "and/or" is used in this application, it is intended to include any combination of the listed components. For example, if a component includes A and/or B, the component may include solely A, solely B, or A and B.

DETAILED DESCRIPTION

Figure 2:
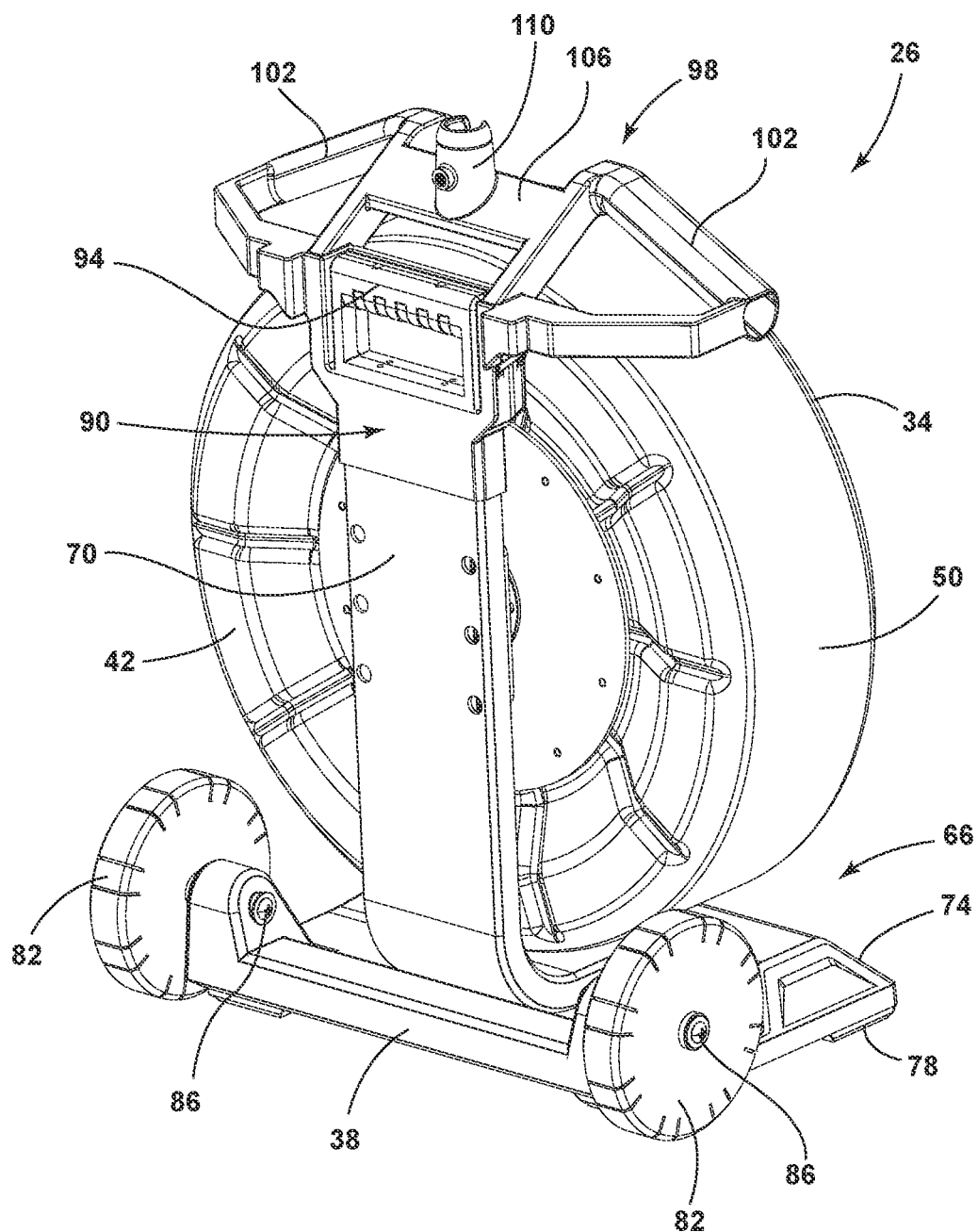
FIG. 2 is a rear perspective view of the reel illustrated in FIG. 1.
Figure 3:
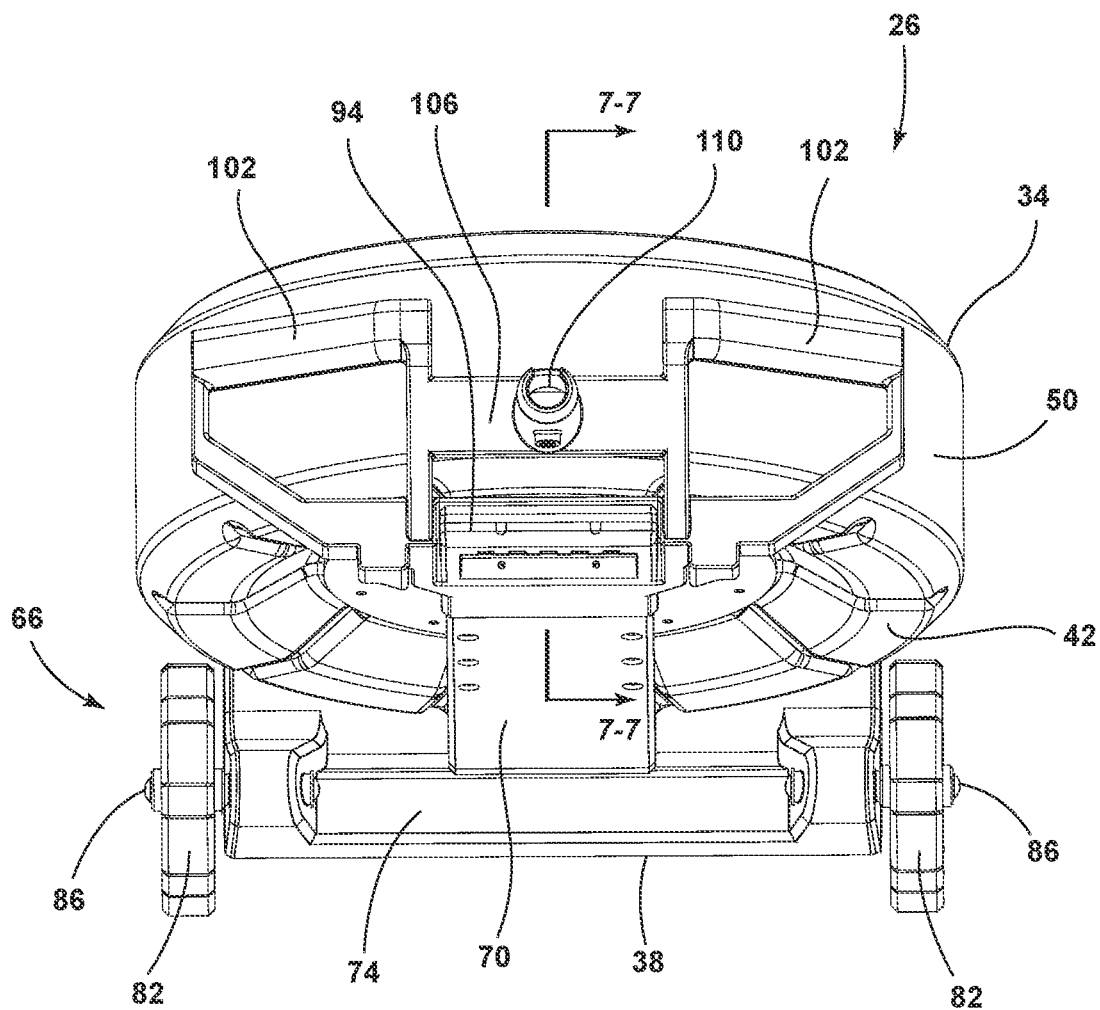
FIG. 3 is a top perspective view of the reel illustrated in FIG. 1.
Figure 4:
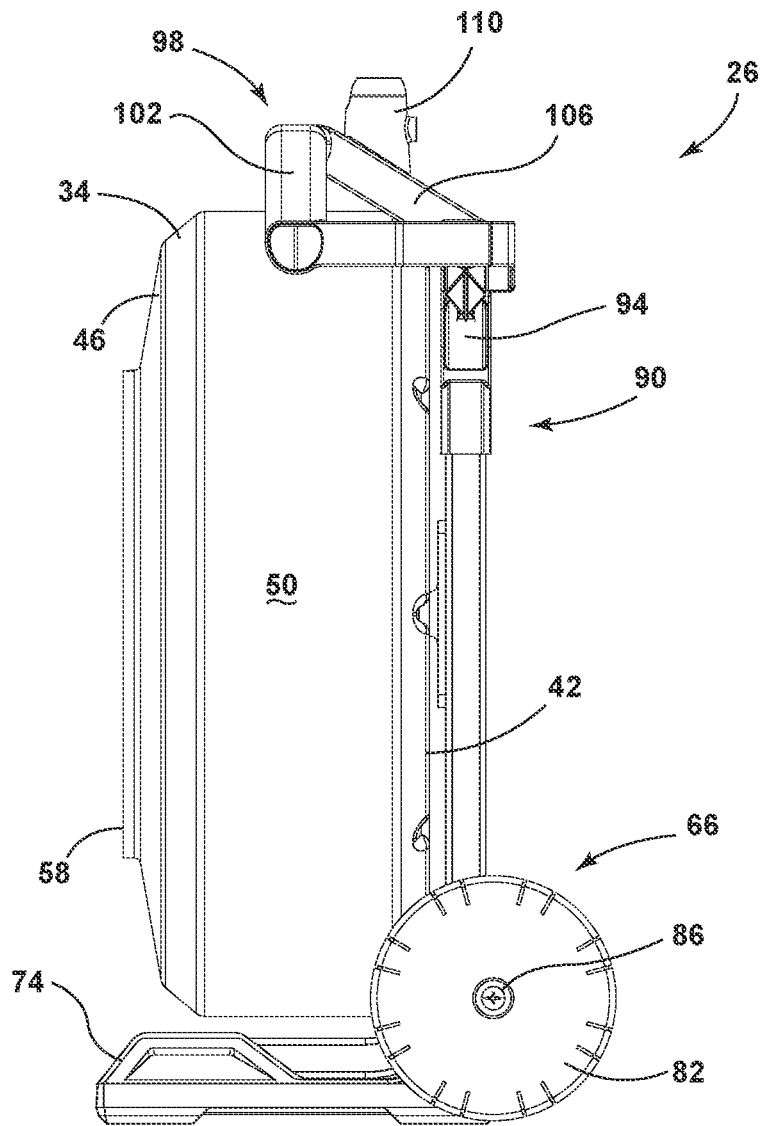
FIG. 4 is a side view of the reel illustrated in FIG. 1.

The disclosure herein provides a pipeline inspection device 10, as shown in FIGS. 1 and 2, that can be used to view the interior of the pipe, conduit, etc., such as a buried sewer pipeline to locate obstructions, blockages, and defects in the pipe. Specifically, a user can use the pipeline inspection device 10 to observe the interior of a pipe, often from a distance away from the closest access port to the sewer pipeline. To view the interior of the pipe, a cable 14 (FIGS. 23 and 24) is directed down an access port of the pipe and through the sewer pipeline. The cable 14 includes an image capturing device (e.g., a camera 18) and/or a locator device 22 (e.g., a snode) connected at a distal end thereof, for viewing the interior 54 of the pipeline.

As explained in U.S. patent application Ser. No. 15/844,270, now U.S. Pat. No. 10,434,547, the entire contents of which are herein incorporated by reference, the pipeline inspection device 10 includes a reel 26 (FIGS. 1-4) for housing the cable 14 and a hub 30 (FIGS. 8-12) for housing a power source and other electronic components for operating the pipeline inspection device 10. The cable 14 is stored on the reel 26 in a wound configuration, but can be unwound and threaded through a length of a pipe under inspection. The hub 30 provides power to the components of the reel 26 in order to operate the pipeline inspection device 10. As discussed in in greater detail below, the hub 30 is removably coupled to the reel 26. In some embodiments, the hub 30 can be interchangeably used with two or more different reels 26.

FIGS. 1-7 illustrate one embodiment of a reel 26. The reel 26 includes a drum 34 for housing the cable 14 and a stand 38 for supporting the drum 34. The drum 34 includes a closed end defined by a back wall 42, and an open end defined by a front wall 46. A side wall 50 extends around the perimeter of the drum 34 between the front wall 46 and the back wall 42. Together, the back wall 42, the side wall 50, and front wall 46 define an interior 54 of the drum 34 that houses the cable 14. The front wall 46 includes an opening 58 that provides access to the interior 54 of the drum 34. As will be discussed in further detail below, the hub 30 (FIGS. 8-12) can be inserted into the drum 34 via the opening 58.

The drum 34 rotates about an axis extending through the back wall 42 and the opening 58 of the front wall 46. The cable 14 is stored within the interior 54 and is wound about the axis of the drum 34. The drum 34 can be different sizes in order to accommodate different size or lengths of cables 14. Because the cable 14 is stiff (e.g., a push cable), the cable 14 exerts an outward force towards the walls of the drum 34, and particularly, towards the side wall 50. Thus, the cable 14 frictionally engages the walls of the drum 34 such that the cable 14 rotates about the axis of the drum 34 as the drum 34 rotates. Rotation of the drum 34 in a first direction causes the cable 14 to unwind so that the cable 14 can be extended into the pipe. In some embodiments, the drum 34 can also be rotated in a second direction to retract the cable 14 from the pipe and wind cable 14 back into the drum 34. In some embodiments, the drum 34 includes ribs on the inside of the drum 34 to provide for increased frictional engagement with the cable 14.

The drum 34 is supported above the ground by the stand 38. The stand 38 includes a base 66 and a center support 70 extending upward from the base 66. In the embodiment illustrated in FIGS. 1-7, the base 66 includes a platform 74, two front feet 78 and two back wheels 82. To transport the reel 26, the center support 70 can be tilted backwards so that the front feet 78 are lifted off of the ground and the wheels 82 can be used to transport the reel 26. When in operation, the front feet 78 engage the ground to inhibit the reel 26 from moving. The wheels 82 are each connected to the platform 74 by an independent axle 86. In other words, in the illustrated embodiment, the wheels 82 are not connected to one another by a single axle 86 extending between both wheels 82. Rather, each wheel 82 is rotatably coupled to the platform 74 by a separate axle 86 that is capable of independent rotation.

The center support 70 includes one or more handles to help maneuver and operate the pipeline inspection device 10. In the illustrated embodiment, the center support 70 includes a first handle assembly 90, including a telescoping handle 94 that retracts into a hollow portion of the center support 70. The telescoping handle 94 can be adjusted between an extended position, for example during transportation, and a retracted position, for example during operation or while stored. When in the extended position, the telescoping handle 94 enables a user to transport the reel 26 in a similar way as a carry-on suitcase. When in the retracted position, the telescoping handle 94 is compactly stored within the center support 70. In the illustrated embodiment, the center support 70 is formed as an extruded aluminum frame 106. This provides for a lightweight material that can receive the handle when in the retracted position. However, in other embodiments, the center support 70 can be formed of steel tubing or other materials.

In the illustrated embodiment, the center support 70 also includes a second handle assembly 98 having two handle bars 102 extending outwardly from the center support 70. The second handle assembly 98 includes a frame 106 that supports the handle bars 102 above the drum 34. The second handle assembly 98 extends in a forward direction above the drum 34, with the handle bars 102 extending outwardly, towards respective wheels 82. Accordingly, the center support 70 includes the first handle assembly 90, which extends in a vertical direction (when oriented as shown in FIG. 2), and a second handle assembly 98, which extends in a horizontal direction (when oriented as shown in FIG. 2). However, in other embodiments, the second handle assembly 98 may be oriented in a different direction. For example, in some embodiments, the second handle assembly 98 may extend backwards, away from the drum 34.

The center support 70 also includes a mount 110 on the second handle assembly 98. The mount 110 can be used to support a monitor 114 (see, FIGS. 20-21), or other component of the pipeline assembly device. The mount 110 is supported on the frame 106 of the second handle assembly 98 in a position between the handle bars 102. In the illustrated embodiment, the mount 110 is a ball mount 110. The ball mount 110 creates a rotatable connection that allows the monitor 114 to be rotated in multiple directions. For example, the ball mount 110 allows for rotation in a swivel direction (e.g., left and right) and a tilt direction (i.e., up and down).

Figure 5:
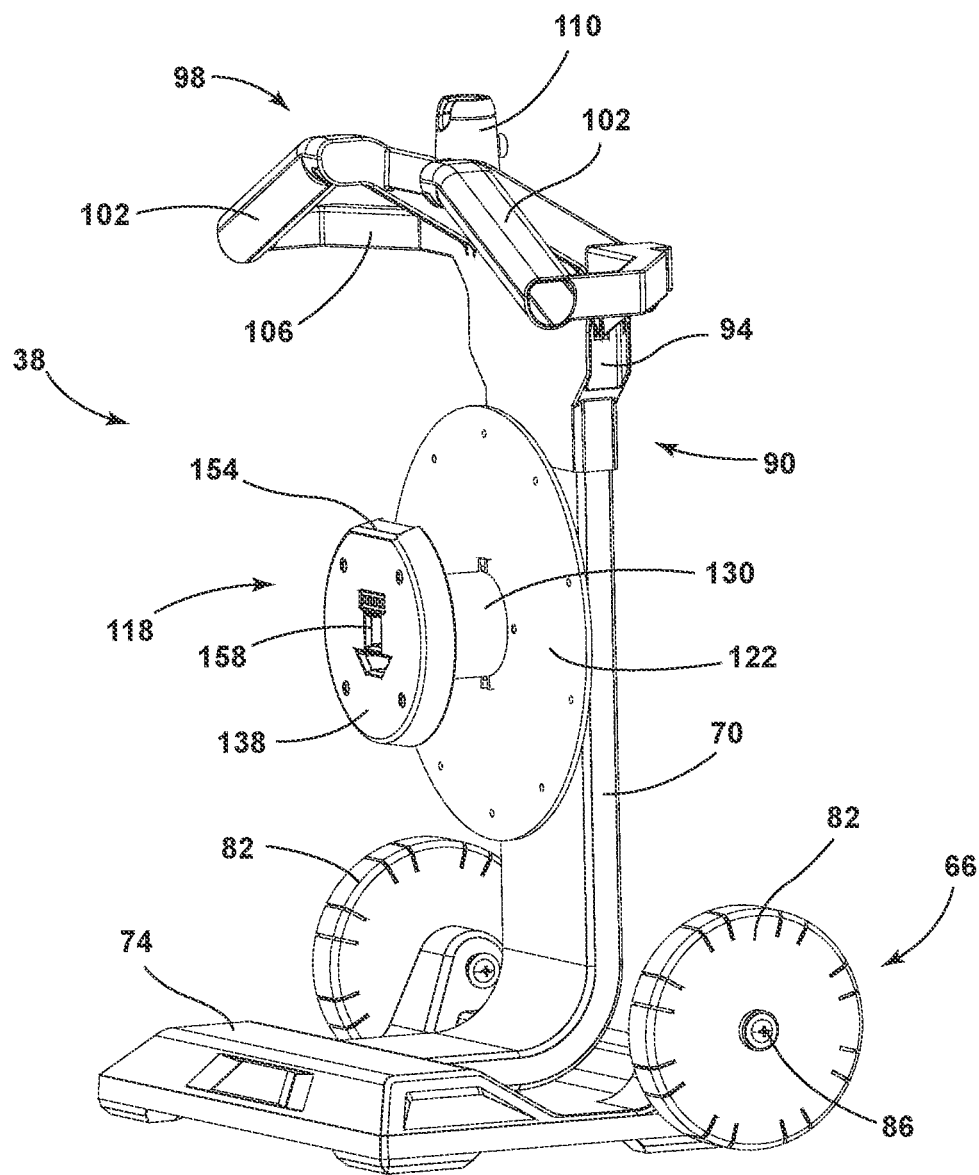
FIG. 5 illustrates the reel of FIG. 1 with a drum removed.
Figure 6:
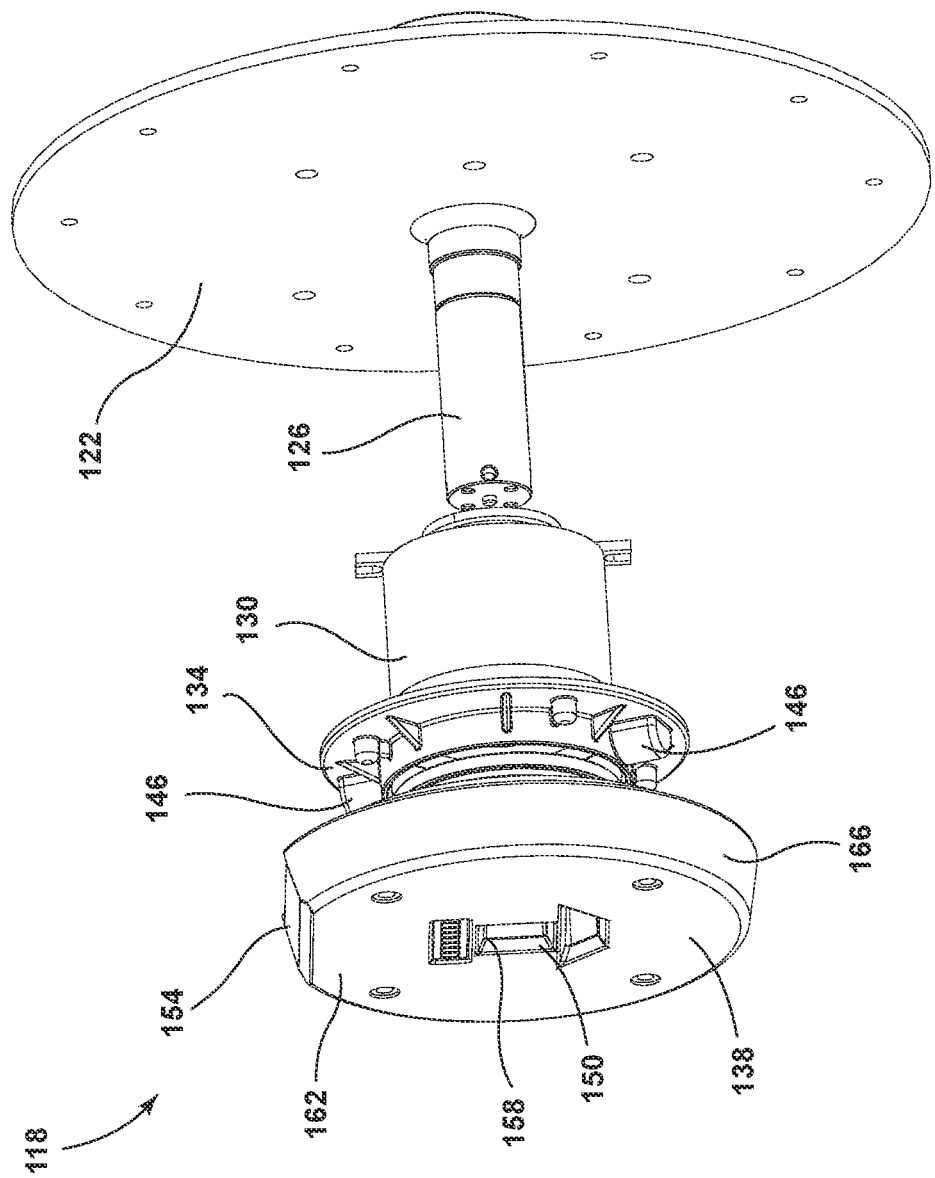
FIG. 6 illustrates a mounting assembly for use with the reel of FIG. 1.
Figure 7:
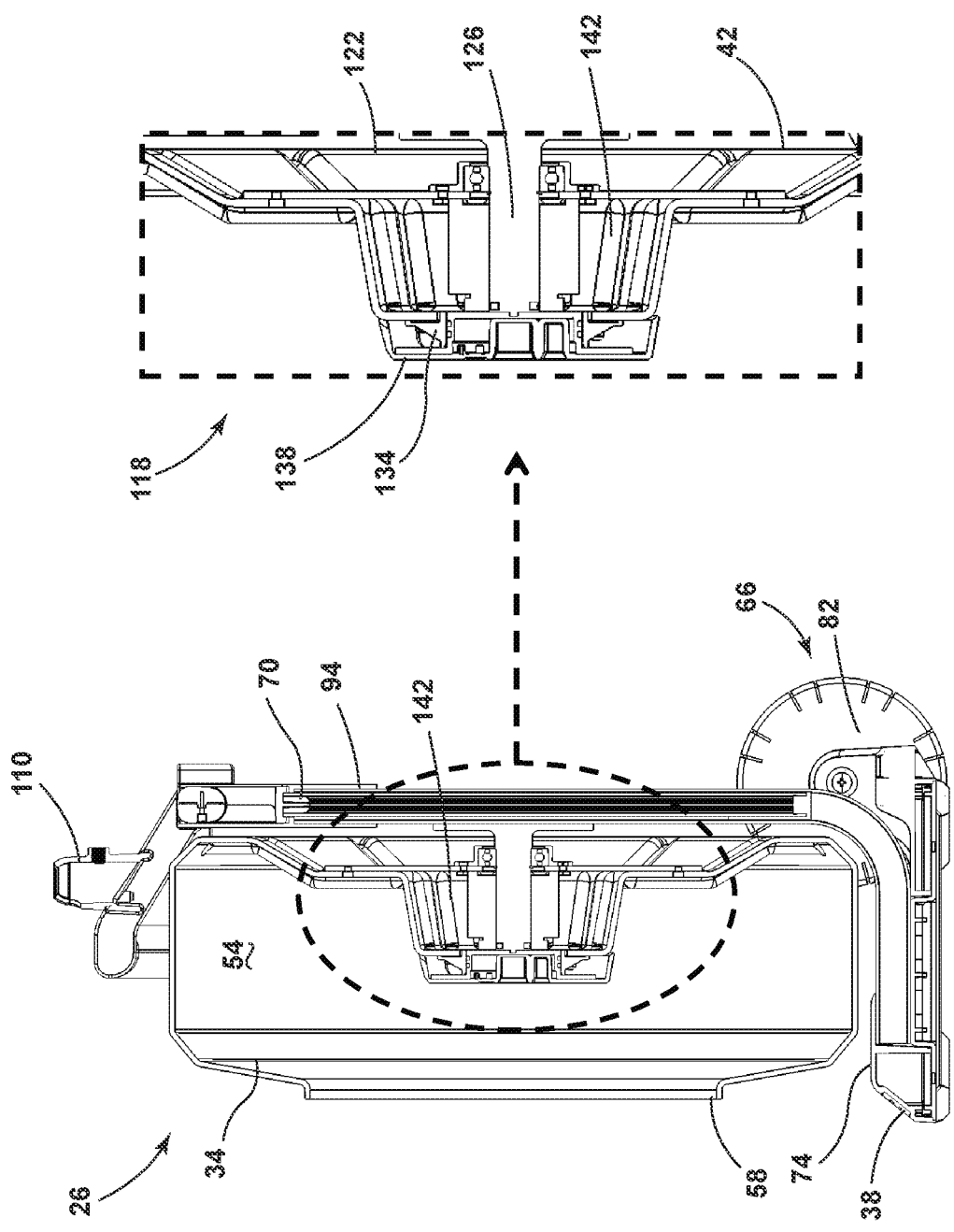
FIG. 7 is a cross-sectional view of the reel illustrated in FIG. 1 taken along section line 7-7 shown in FIG. 3.
Figure 8:
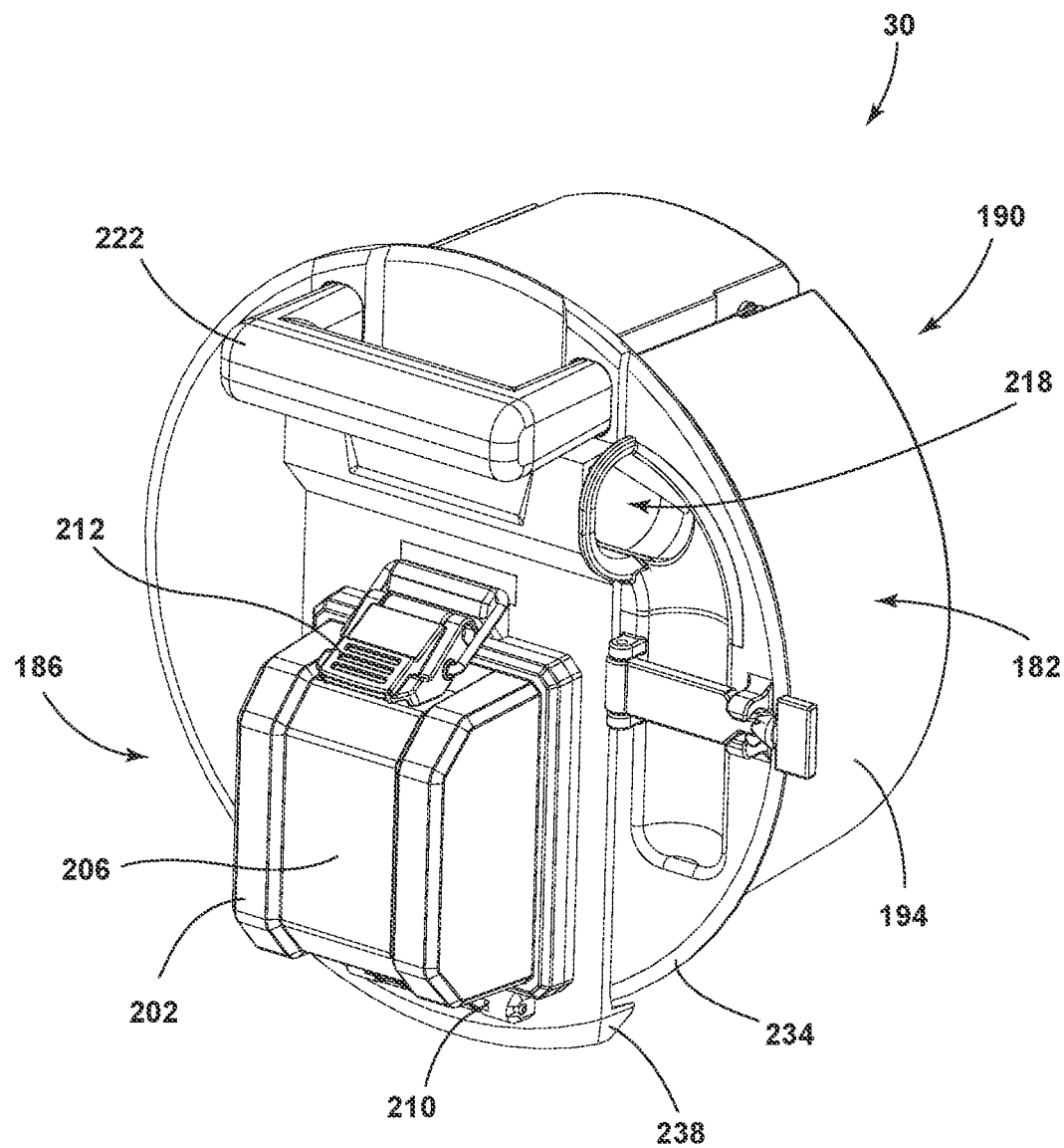
FIG. 8 is a front perspective view of a hub for use with a pipeline inspection device.
Figure 9:
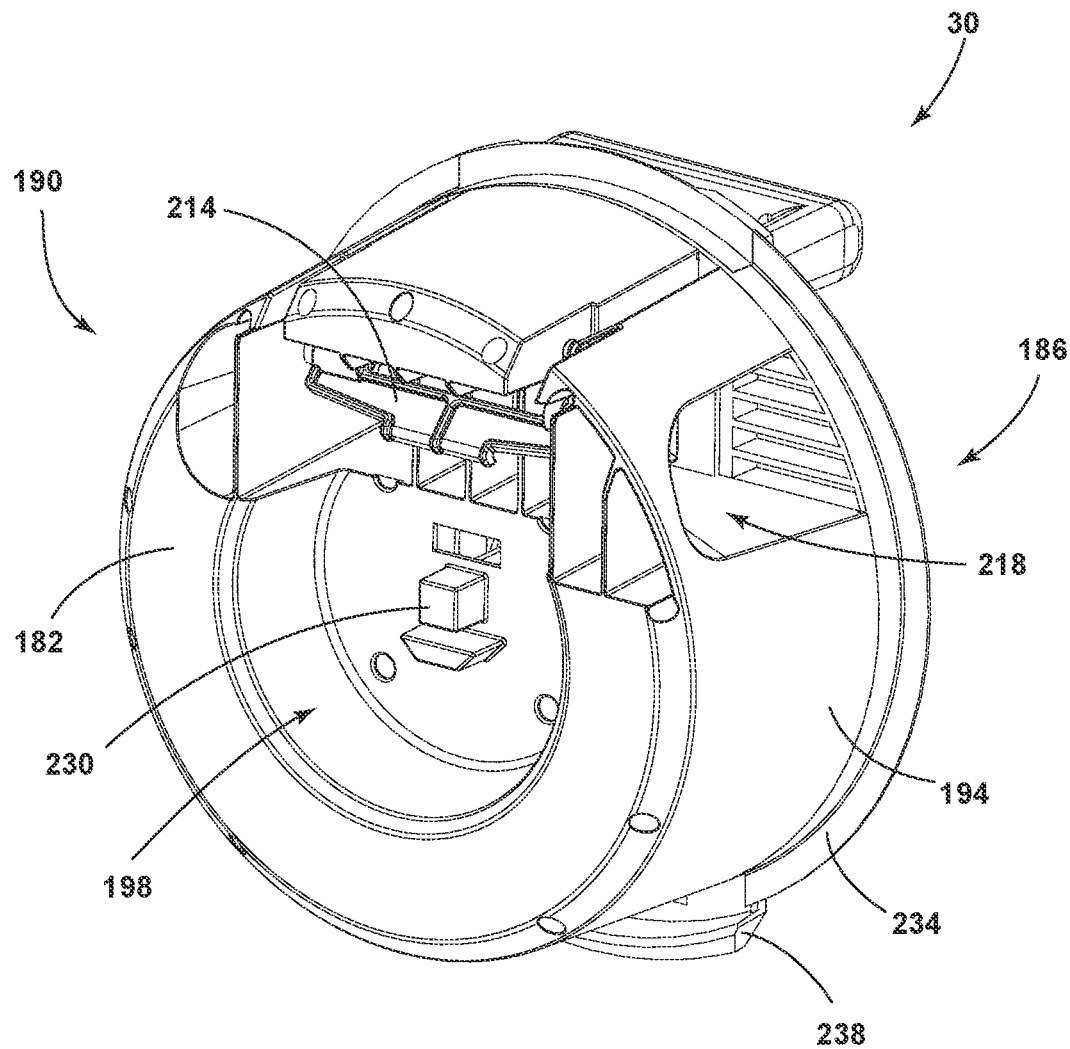
FIG. 9 is a rear perspective view of the hub illustrated in FIG. 8.
Figure 10:
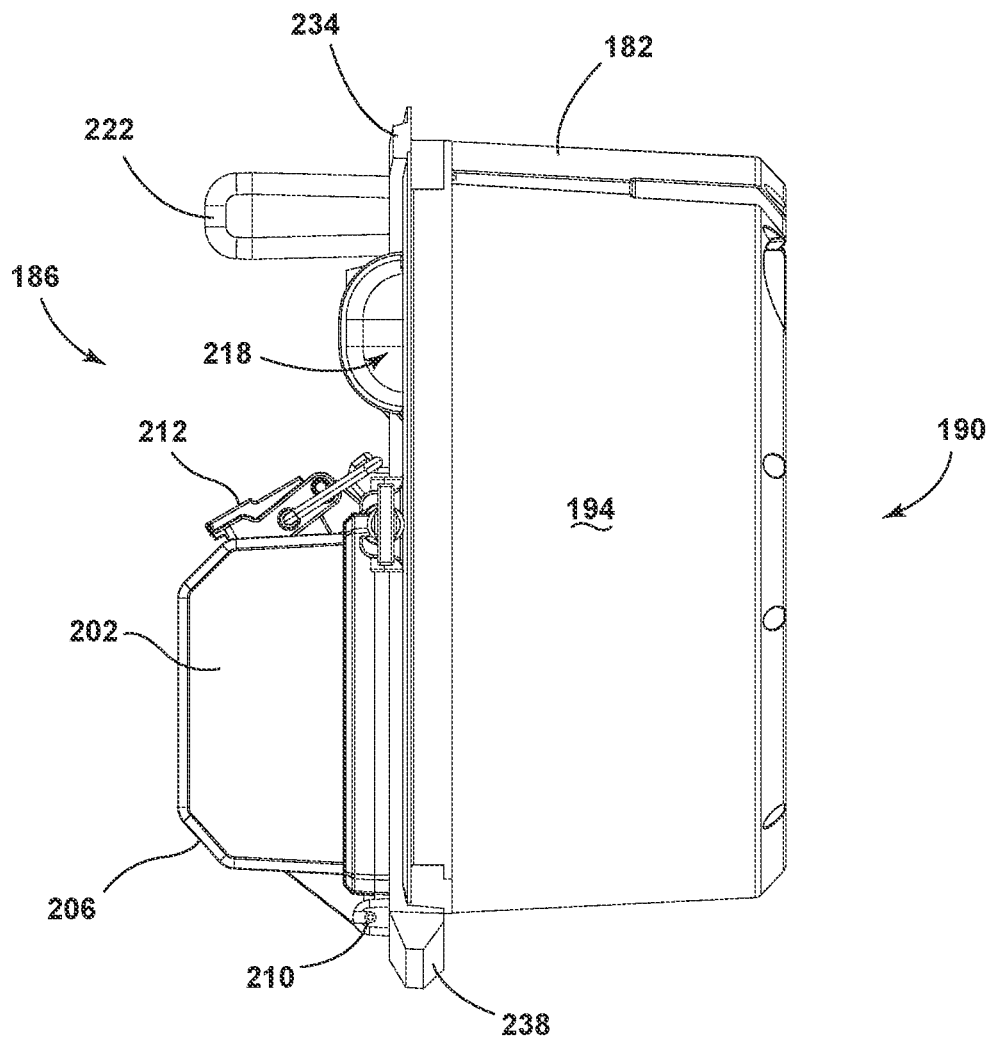
FIG. 10 is a first side view of the hub illustrated in FIG. 8.
Figure 11:
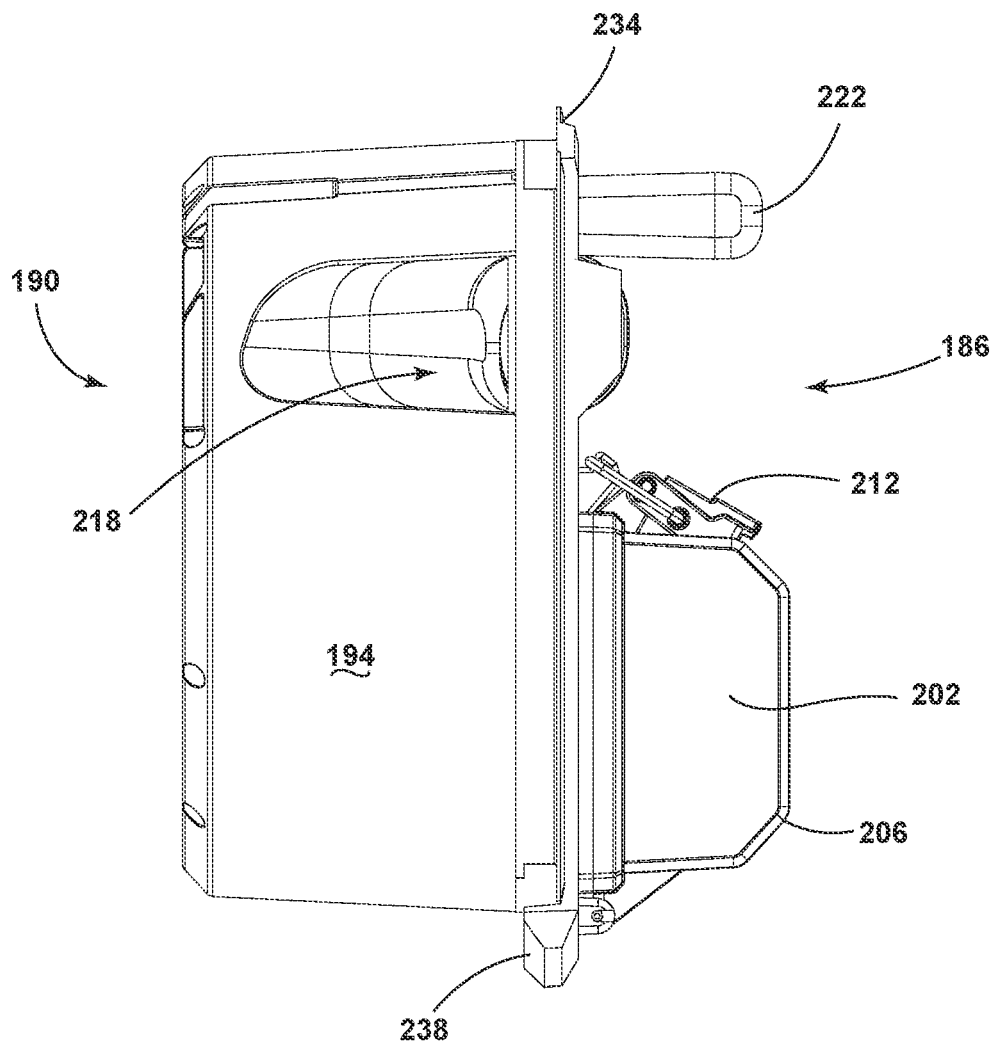
FIG. 11 is a second side view of the hub illustrated in FIG. 8.
Figure 12:
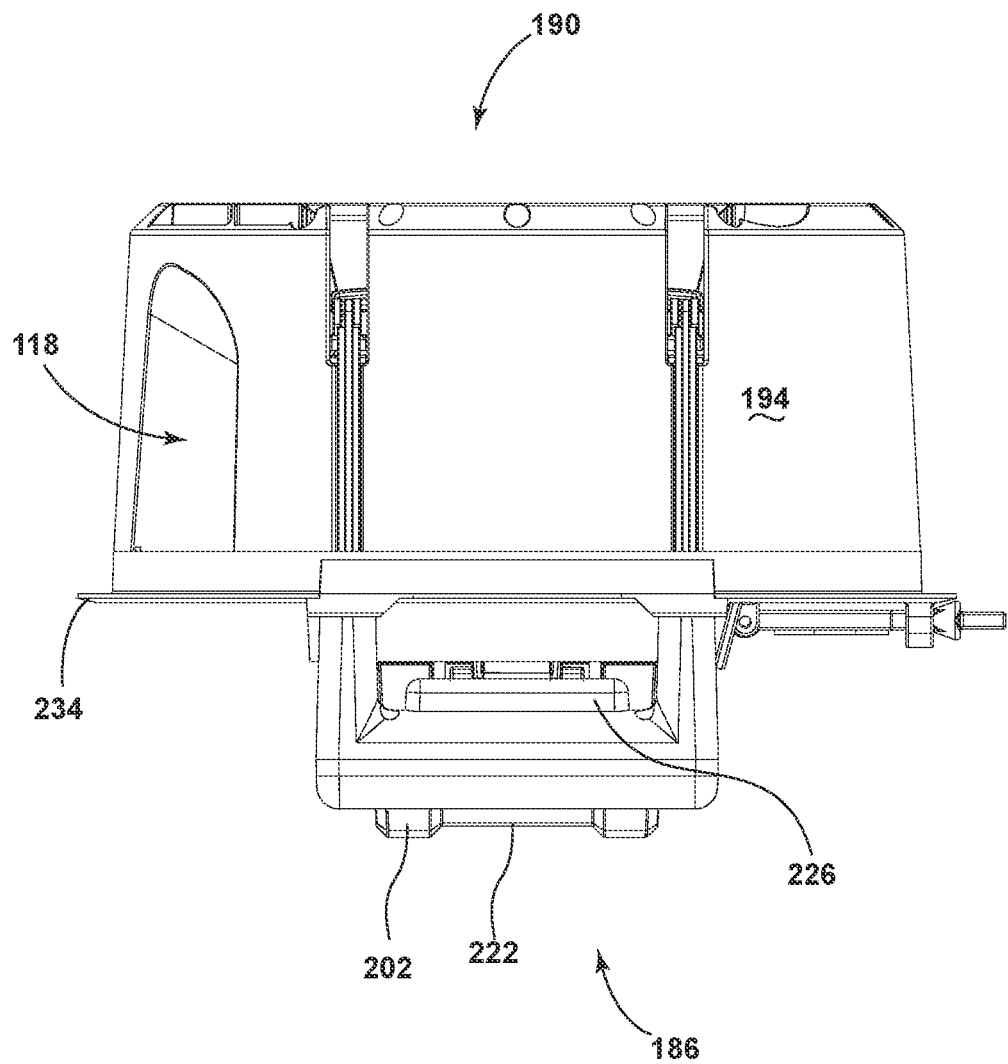
FIG. 12 is a top view of the hub illustrated in FIG. 8.

With references to FIGS. 5-7, the drum 34 is supported on the stand 38 by a mounting assembly 118. The mounting assembly 118 includes a rotatable portion and a fixed portion. The drum 34 is mounted on the rotatable portion of the mounting assembly 118, while the hub 30 is mounted to the reel 26 via the fixed portion of the mounting assembly 118. The mounting assembly 118 includes a mounting plate 122, a shaft 126, a slip ring 130, a disk 134, and a core 138. The mounting plate 122, (a portion of) the slip ring 130, and the disk 134 are rotatably fixed relative to one another, and thus, rotate together with the drum 34. Thus, the rotatable portion of the mounting assembly 118 includes the mounting plate 122, the slip ring 130, and the disk 134. In other words, the drum 34, the mounting plate 122, the slip ring 130, and the disk 134 rotate together relative to the stand 38. The shaft 126 and the core 138, on the other hand are rotatably fixed relative to one another and relative to the stand 38. The fixed portion of the mounting assembly 118 includes the shaft 126 and the core 138.

The shaft 126 is coupled to the center support 70 of the stand 38. The shaft 126 provides a cantilevered support for the drum 34 above the platform 74 of the stand 38. Specifically, the shaft 126 engages and supports the drum 34 only via the back wall 42. Because the drum 34 includes the opening 58 in the front wall 46, the shaft 126 does not extend through the entire width of the drum 34 or engage the front wall 46. This creates a cantilever effect whereby the drum 34 is cantilevered over the platform 74 by the engagement of the shaft 126 with the back wall 42 of the drum 34. This cantilevered design enables the front wall 46 of the drum 34 to include the opening 58 for inserting the hub 30 into the interior 54 of the drum 34.

The mounting plate 122 is fixed to the back wall 42 of the drum 34. In some embodiments, the mounting plate 122 is integral with the back wall 42 of the drum 34. The slip ring 130 is disposed within a space 142 (FIG. 7) formed by the back wall 42 of the drum 34. The slip ring 130 allows for transmission of electrical signals, while allowing the drum 34 to rotate relative to the reel 26. The mounting plate 122 and the slip ring 130 rotatably support the drum 34 on the shaft 126. Specifically, the shaft 126 extends at least partially through the mounting plate 122 and the slip ring 130, which allow the drum 34 to rotate about the shaft 126.

The disk 134 also rotates with the drum 34. The disk 134 includes magnets 146 that rotate with the disk 134 and the drum 34 as the cable 14 is unwound from the drum 34. The magnets 146 are used in conjunction with a sensor 150 (FIG. 6) on the hub 30 to measure how much cable 14 has been unwound. Specifically, as the drum 34 rotates, the magnets 146 rotate about the axis of the drum 34. The sensor 150 (e.g., a Hall sensor) is located on the stationary hub 30 along the axis. As the magnets 146 rotate, the sensor 150 can monitor the movement of the magnets 146 to determine how much cable 14 has been extended from the drum 34.

The core 138 is coupled to a distal end of the shaft 126. The core 138 does not rotate with the drum 34, but rather, is fixed relative to the shaft 126 and the stand 38. The core 138 supports the hub 30 when the hub 30 is inserted into the interior 54 of the drum 34 via the opening 58 on the front wall 46. The core 138 includes an engagement surface 154 that enables the hub 30 to be removably coupled to the reel 26. The core 138 also includes electrical connections that engage with electrical connections on the hub 30. In addition, the core 138 includes at least one recess 158 that aligns and engages with a portion of the hub 30. The recesses 158 help secure the hub 30 to the reel 26 and maintain a slide electrical connection between the two.

In the illustrated embodiment, the core 138 has a circular face 162 with an annular lip 166 extending around the perimeter of the face 162. The engagement surface 154 is formed along the lip 166 on a top side of the core 138. Specifically, the engagement surface 154 is formed by a flattened portion of the annular lip 166. The hub 30 can grip the core 138 along the flattened portion of the lip 166. In other embodiments, the core 138 can be different shapes that are suitable to provide an engagement surface 154 for coupling to the hub 30.

Figure 23:
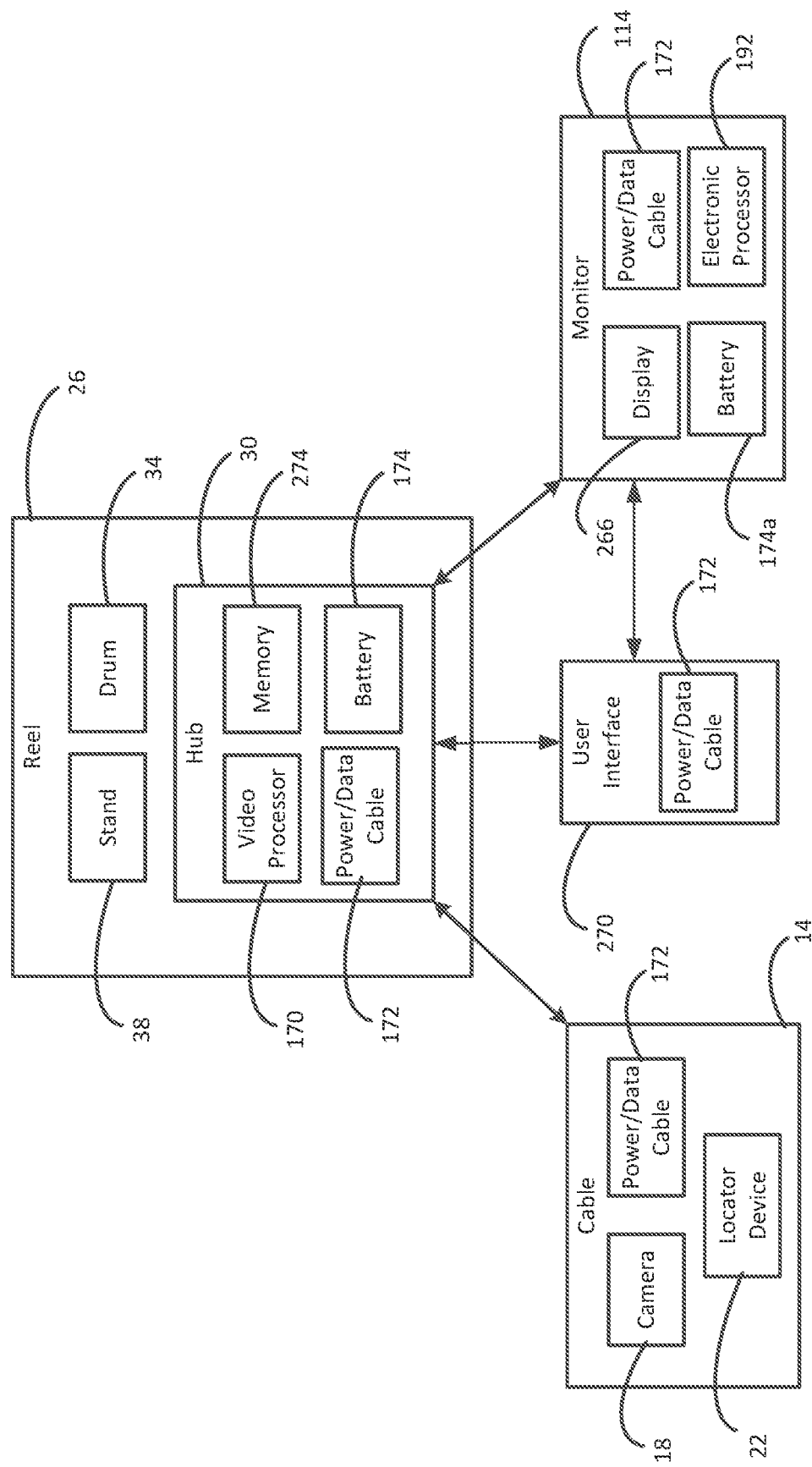
FIG. 23 is a schematic diagram of a pipeline inspection device according to one embodiment.

Referring to FIG. 23, the hub 30 includes a power source and other electrical components for operating the pipeline inspection device 10. For example, the hub 30 may include a video processor 170, a battery 174, a wireless communication device 178 (e.g., a Wi-Fi hub, a Bluetooth controller), etc. In other embodiments, the hub 30 may include more or fewer of these electrical components. For examples, in some embodiments, the hub 30 does not include a wireless communication device 178, but rather, includes wired connections to the monitor 114 and other components. Similarly, in some embodiments, the hub 30 does not include a video processor 170. Instead, the video processor 170 may be integrated into the monitor 114. In some embodiments, the wireless communication device 178 includes one or more wireless transceivers communicatively coupled to one or more antennas to allow the wireless communication device 178 to communicate bidirectionally with other devices that include a wireless communication device similar to the wireless communication device 178.

Referring to FIGS. 8-12, the hub 30 includes a cylindrical body 182 that is received within the interior 54 of the drum 34. The cylindrical body 182 is defined by a front end 186, a rear end 190, and an outer wall 194 extending around the perimeter of the hub 30 between the front end 186 and the rear end 190. The rear end 190 of the hub 30 has a cavity 198 that includes various mating members that engage with the core 138 of the reel 26. The mating members secure the hub 30 to the reel 26 and help align the hub 30 and maintain a solid connection between the hub 30 and the reel 26. These mating members will be described in greater detail below.

The cylindrical body 182 defines a housing for maintaining the electrical components of the pipeline inspection device 10. In some embodiments, the body 182 is air and/or water tight in order to protect the electrical components. In the illustrated embodiment, the front end 186 of the hub 30 includes a battery housing 202 for receiving a battery 174. The battery 174 is removable from the battery housing 202 of the hub 30. The battery housing 202 includes a cover 206 that can be opened and closed to insert and remove the battery 174, respectively. The cover 206 forms an air and/or water tight seal to protect the battery 174 and other electrical components. The cover 206 is attached to the front end 186 by a hinge 210 and a latch 212. The hub 30 also includes a channel 218 extending through the cylindrical body 182 from the outer wall 194 to the front end 186. When the hub 30 is inserted in the drum 34, the channel 218 receives the cable 14 and helps guide the cable 14 into or out of the drum 34. In addition, the hub 30 may include a holding mechanism configured to hold the camera 18 during storage such that the cable 14 is prevented from spooling out and the camera 18 is prevented from falling into the hub 30.

In addition, the hub 30 includes a handle 222 provided on the front end 186 of the hub 30. The handle 222 extends outwardly from the front end 186 of the hub 30 and can be used to maneuver the hub 30 into the opening 58 of the drum 34. The handle 222 includes a trigger 226 (FIG. 12) that activates a latch 214 on the rear end 190 of the cylindrical body 182. The latch 214 is one of the mating members disposed within the cavity 198 of the hub 30. The latch 214 is configured to engage with the engagement surface 154 on the core 138 of the mounting assembly 118 of the reel 26. Pressing the trigger 226 rotates the latch 214 from a locked position to an unlocked position. In the illustrated embodiment, pressing the trigger 226 rotates the latch 214 upward into the unlocked position. The latch 214 is biased towards the locked position such that releasing the trigger 226 causes the latch 214 to rotate downward and into the locked position.

The hub 30 also includes various other mating members that help align and support the hub 30 within the drum 34. The cavity 198 of the hub 30 includes at least one protrusion 230 that is shaped to align with the recesses 158 on the core 138 of the mounting assembly 118. For example, the hub 30 includes a square protrusion 230 that is received within the square recess 158 on the face 162 of the core 138. The protrusion 230 defines a pocket that receives the sensor 150 for monitoring movement of the magnets 146 to help determined the amount of cable 14 that has been extended from the drum 34. In some embodiments, the core 138 and the hub 30 may include more or fewer recesses 158 and protrusions 230, respectively, to help align the hub 30 with the drum 34. In the illustrated embodiment, the hub 30 also includes a rim 234 that extends around the perimeter of the cylindrical body 182 for mating with the opening 58 of the drum 34. When the hub 30 is received within the drum 34, the rim 234 engages with the edge of the opening 58 to help align the hub 30 relative to the drum 34. In the illustrated embodiment, the rim 234 further includes a hook 238 to help grip the edge of the opening 58 in the drum 34. In the illustrated embodiment, the hook 238 is arcuate and extends along a bottom edge of the rim 234.

As previously mentioned, the hub 30 is removable from the drum 34 and may be attached to two different sized reels 26. Pipes typically come in two different sizes: a 1.5 to 3 inch diameter pipe and a 3 to 6 inch diameter pipe. Each of the two types of pipes requires a different diameter camera and cable. The smaller pipe (i.e., 1.5 to 3 inch pipe) requires a smaller diameter camera and cable that is more flexible, while the larger pipe requires a larger diameter camera and cable. Each of the smaller diameter camera and cable and the larger diameter camera and cable requires a corresponding large or small sized reel and cable drum, which are part of correspondingly sized pipeline inspection devices. In the illustrated embodiment, the hub 30 may be removably detached and interchangeably attached to each of the drums of the different sized pipeline inspection devices, such that a user only needs a single hub 30 containing the electronics (e.g., the video processor 170, the battery 174, the wireless communication device 178 (Wi-Fi hub), etc.) that can be used with either of the reels 26.

FIGS. 13-18 provide another embodiment of a reel 26a that can be used with the hub 30. The reel 26a illustrated in FIGS. 13-18 is smaller than the reel 26 illustrated in FIGS. 1-6. In the embodiment illustrated in FIGS. 13-18, the reel 26a is a more compact size to improve transportability. For example, in the illustrated embodiment, the reel 26a can be carried as a backpack. The reel 26a includes a drum 34a supported by a stand 38a. The drum 34a includes an open front wall 46a defining an opening 58a for receiving the hub 30 and a closed back wall 42a for mounting to the stand 38a. The stand 38a includes a platform 74a and a center support 70a extending upwardly from the platform 74a. A backpack plate 242 is removably coupled to the center support 70a. The backpack plate 242 can include backpack straps that enable a user to carry the reel 26a on his/her back. If desired, the backpack portion of the reel 26a (i.e., the backpack plate 242 and straps) can be removed from the reel 26a.

Figure 20:
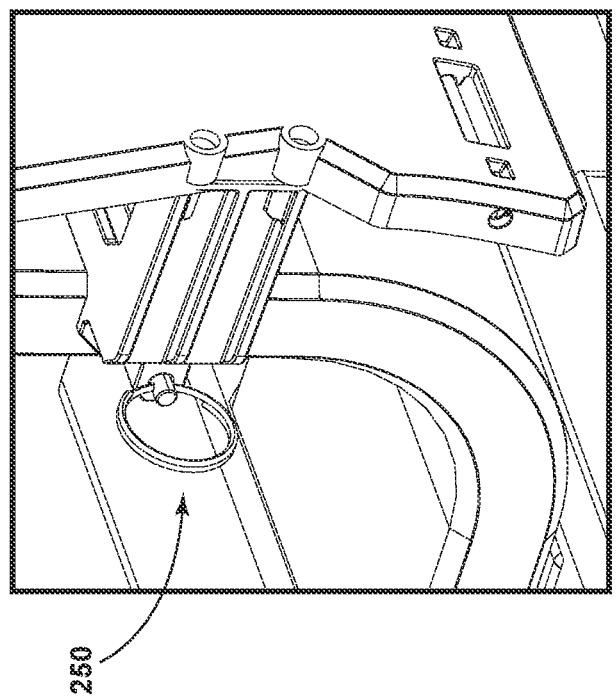
FIG. 20 is a detailed view of a locking pin.

The backpack plate 242 is removably coupled to the stand 38a by a slot and locking pin 250 (FIG. 20). The top portion of the backpack plate 242 includes a slot 236 for receiving a hook 238 disposed on center support 70a. The bottom portion of the backpack plate 242 includes the locking pin 250. The locking pin 250 includes pin holes in the backpack plate 242 and the center support 70a, and a pin that extends through both holes. To remove the backpack plate 242, the pin is removed from the holes to release the backpack plate 242.

Figure 13:
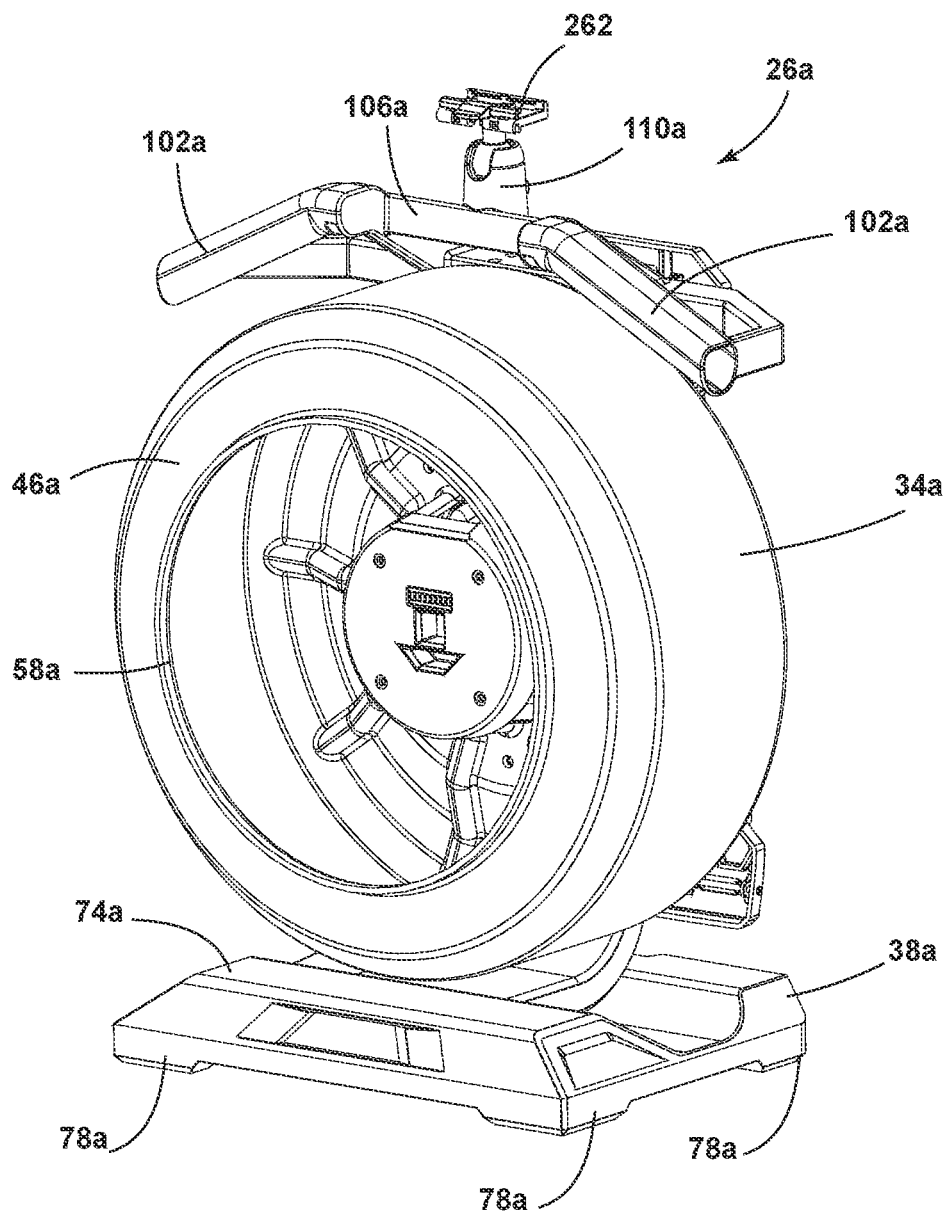
FIG. 13 is a front perspective view of a reel for use in a pipeline inspection device according to a second embodiment.
Figure 14:
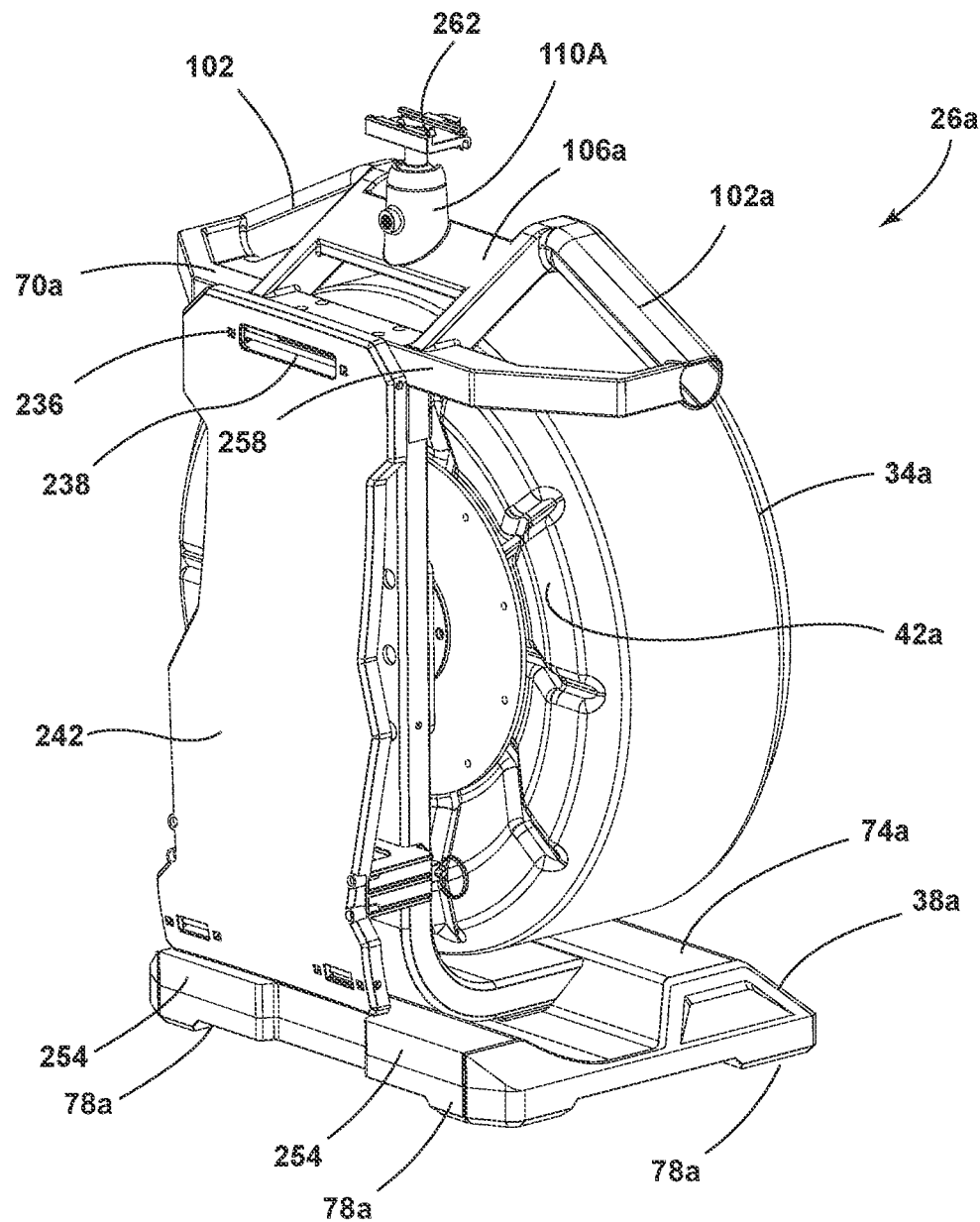
FIG. 14 is a rear perspective view of the reel illustrated in FIG. 13.
Figure 15:
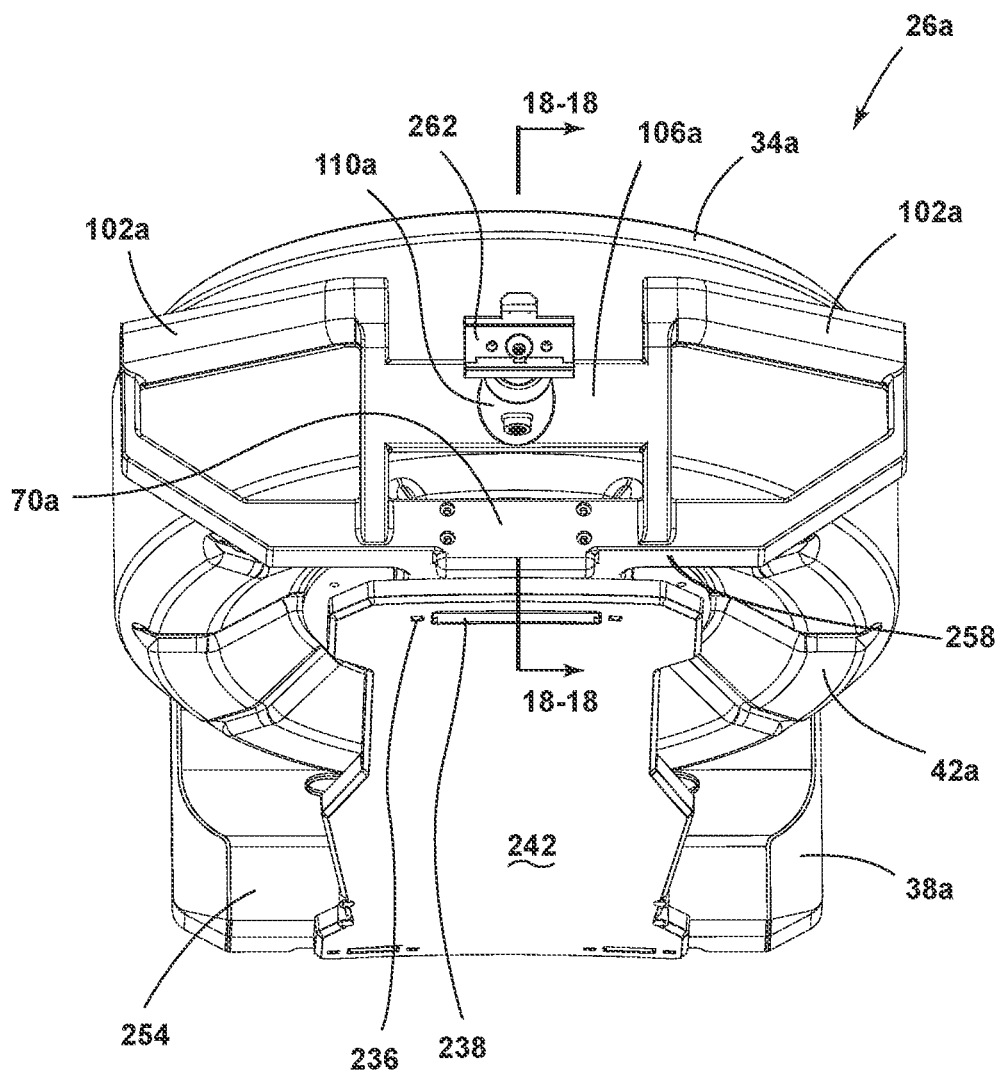
FIG. 15 is a top perspective view of the reel illustrated in FIG. 13.
Figure 16:
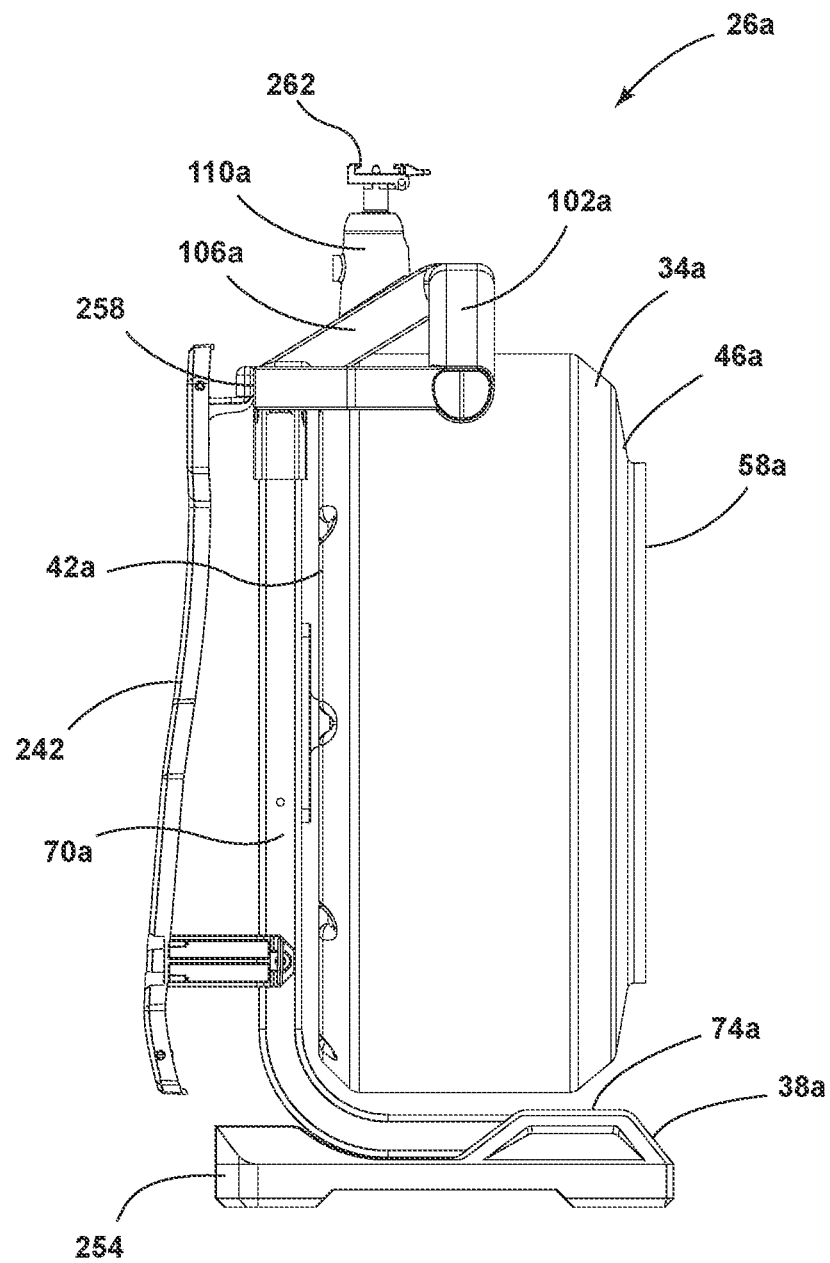
FIG. 16 is a side view of the reel illustrated in FIG. 13.
Figure 17:
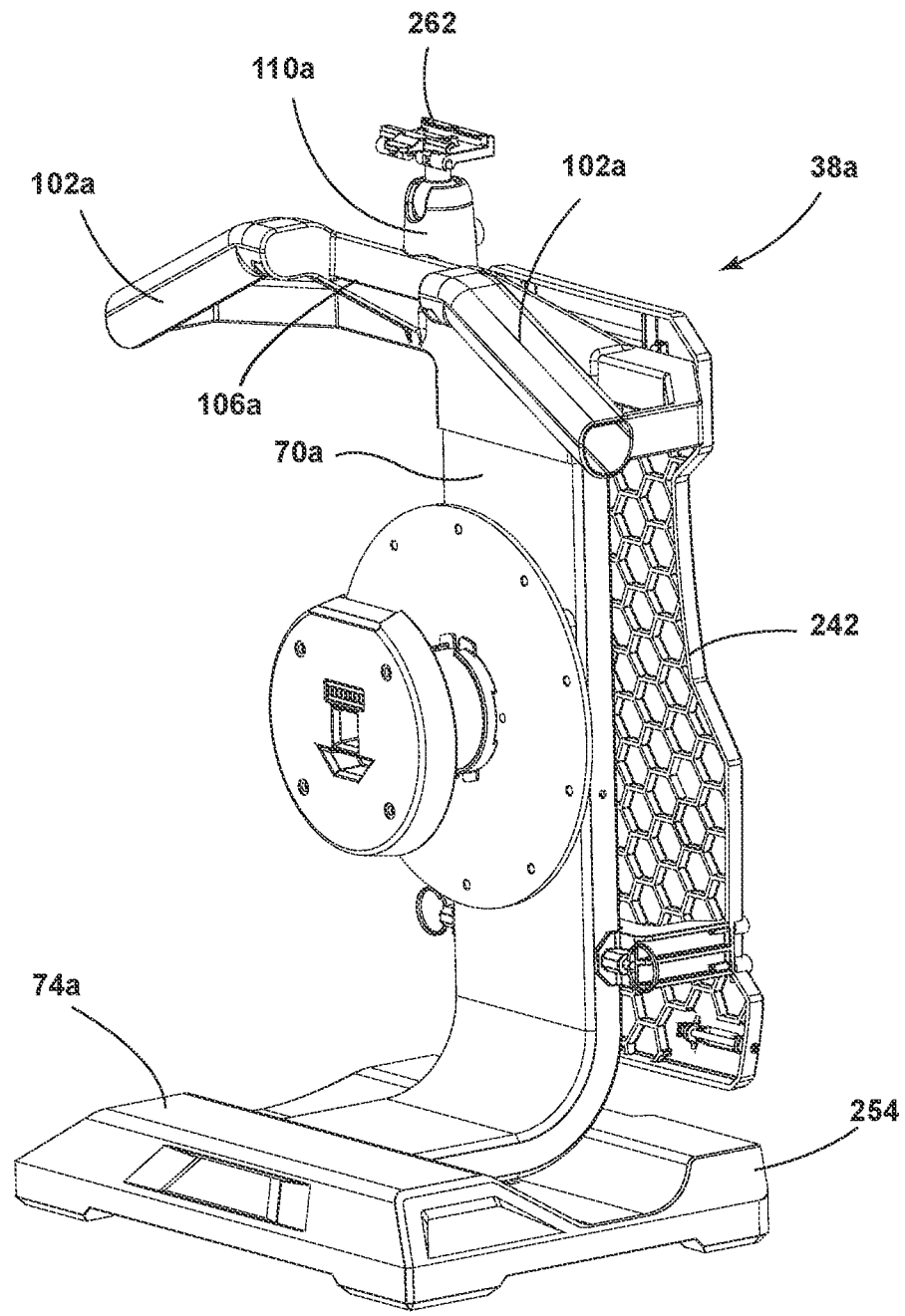
FIG. 17 illustrates the reel of FIG. 13 with a drum removed.
Figure 18:
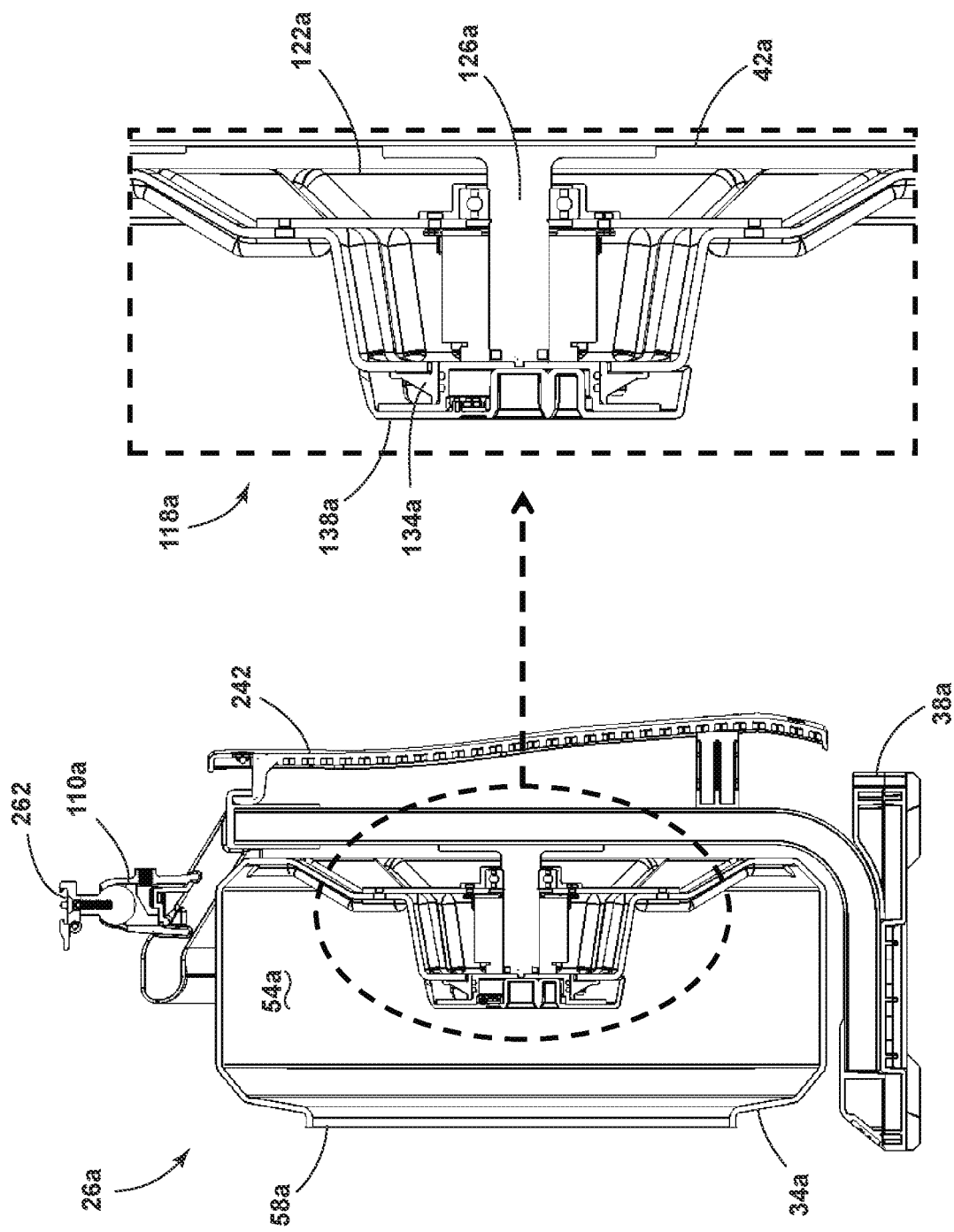
FIG. 18 is a cross-sectional view of the reel illustrated in FIG. 13 taken along section line 18-18 shown in FIG. 15.

The reel 26a is configured to be operated in either a vertical orientation or a horizontal orientation. The stand 38a includes feet 78a along a bottom surface of the platform 74a for supporting the reel 26a in an upright (i.e., vertical) position, as shown in FIG. 13. The stand 38a can also be oriented in a horizontal position by laying the reel 26a on the center support 70a with the backpack plate 242 removed. The stand 38a includes a first surface 254 along a bottom of the stand 38a and a second surface 258 along the top of the stand 38a that can support the reel 26a in a horizontal orientation. Specifically, the first surface 254 extends along a back edge of the platform 74a, and the second surface 258 extends along a back edge of the center support 70a. Together, the first surface 254 and the second surface 258 form a second set of feet 78a for supporting the reel 26a in a horizontal orientation.

In addition, the reel 26a includes a handle assembly supported by the center support 70a. Specifically, the center support 70a includes a handle assembly having two handle bars 102a extending in outwardly from the center support 70a. The handle assembly includes a frame 106a that supports the handle bars 102a above the drum 34a. The handle assembly extends in a forward direction above the drum 34a, with the handle bars 102a extending outwardly.

Figure 19:
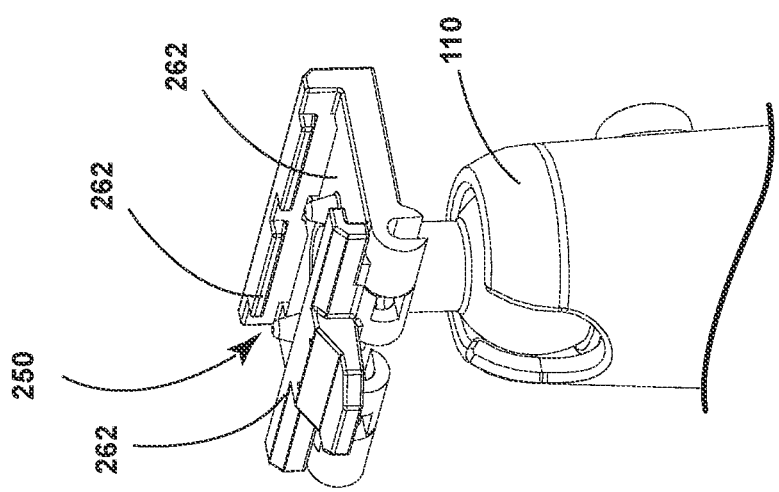
FIG. 19 is a detailed view of a ball mount.

The center support 70a also includes a mount 110a on the handle assembly. The mount 110a can be used to removably support the monitor 114 (see, FIGS. 21-22), or other component of the pipeline assembly device. The mount 110a is supported on the frame 106a of the handle assembly in a position between the handle bars 102a. In the illustrated embodiment, the mount 110a is a ball mount 110a that is capable of rotating in two directions. For example, the ball mount 110a allows for rotation in a swivel direction (e.g., left and right) and a tilt direction (i.e., up and down). In this embodiment, that ball mount 110a includes a clip 262, shown in FIG. 19, which allows for a quick attachment/detachment of the monitor 114a or other component. For example, the clip 262 can include a snap fit connection, a slide connection, a detent connection, or the like. The clip 262 includes a set of rails 260 that form a channel 264. This allows components, such as the monitor 114, to be slidably received within the channel 264.

Figure 21:
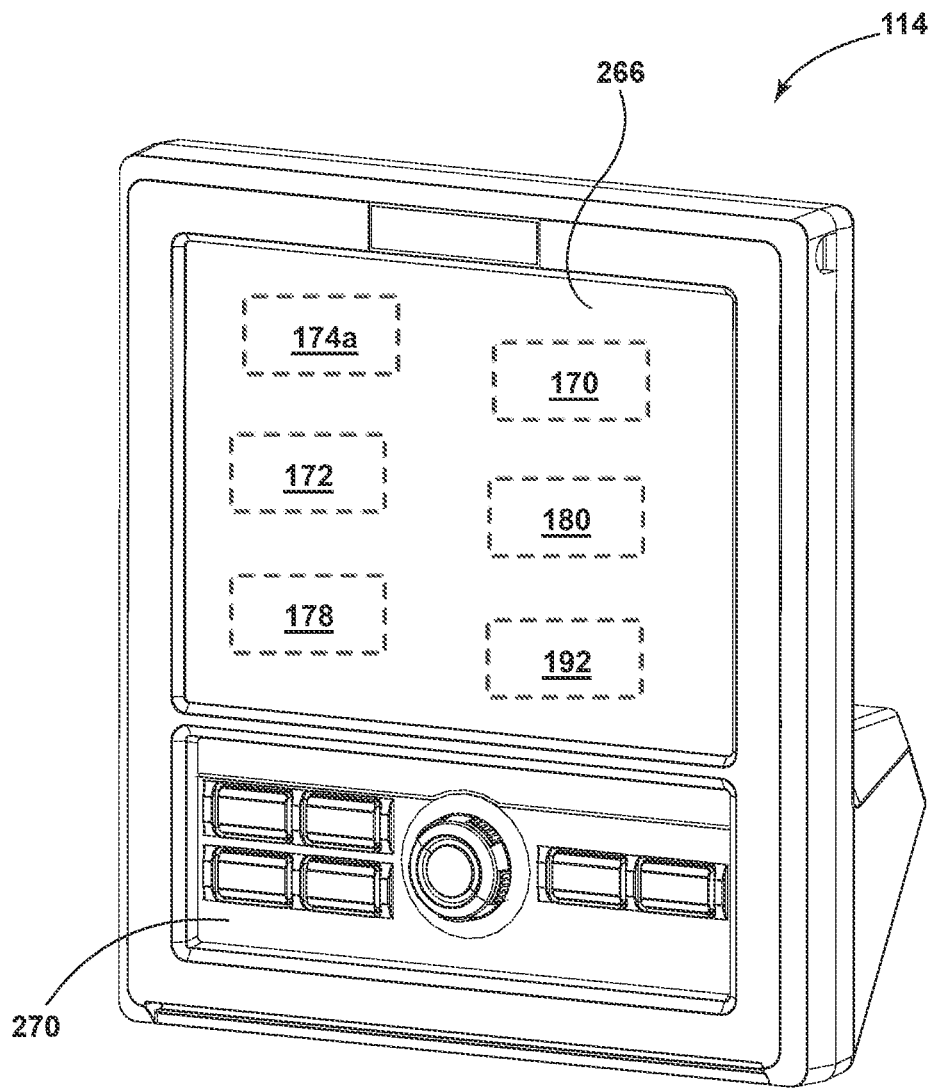
FIG. 21 is a front perspective view of a monitor for use with a pipeline inspection device.
Figure 22:
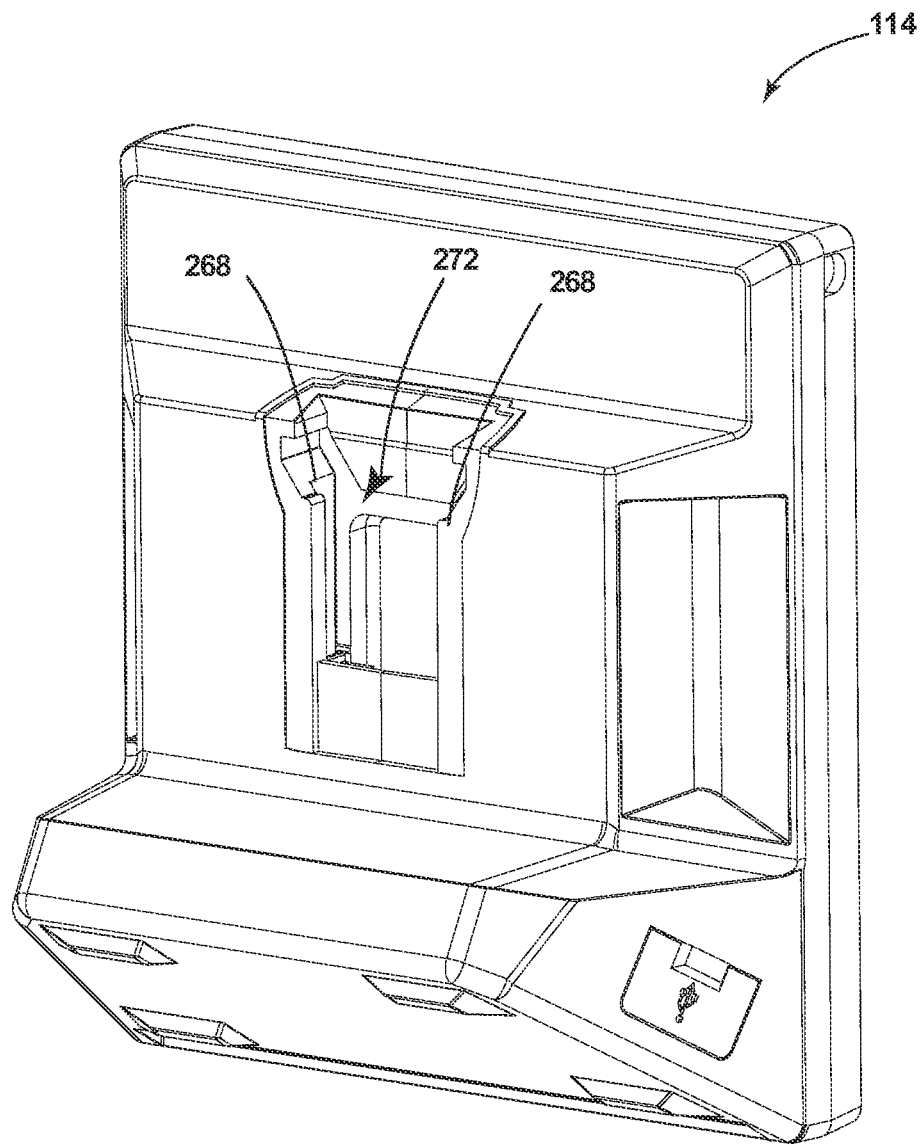
FIG. 22 is a rear perspective view of the monitor illustrated in FIG. 21.
Figure 24:
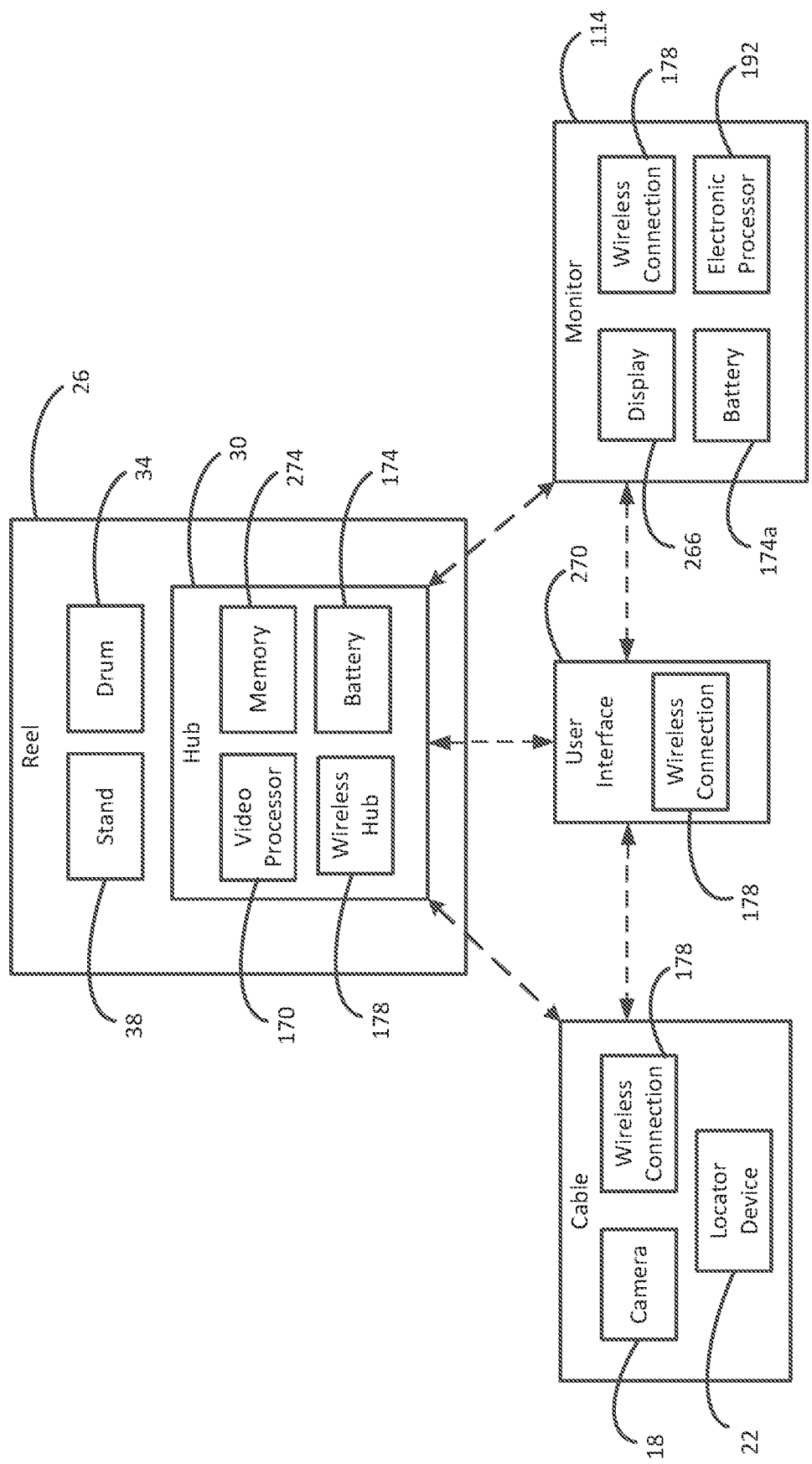
FIG. 24 is a schematic diagram of a pipeline inspection device according to another embodiment.

FIGS. 21-22 provide an embodiment of the monitor 114, which can be used with the reels 26, 26a illustrated herein. The monitor 114 is configured to engage with the clip 262 on the mount 110a. Specifically, the monitor 114 includes a set of rails 268 that form a channel 272. The rails 268 and the channel 272 of the monitor 114 are configured to slidably engage with the rails 260 and the channel 264 on the clip 262 portion of the mount 110a. Thus, the monitor 114 can be slid onto the clip 262 to be supported on the reel 26a. The monitor 114 includes a display device 266 for viewing an image or video captured by the camera 18, and a user interface 270 for controlling the camera 18 and/or the display device 266. In some embodiments, the user interface 270 may be a separate device from the display device 266. For example, the user interface 270 may be on a user mobile device, such as through an application on a phone. This may allow a user to control the operation of the pipeline inspection device 10 through the application on the phone. In some embodiments, the monitor 114 is a dedicated monitor specifically configured to only work with the pipeline inspection system. In other embodiments, the monitor 114 is embodied as a separate electronic device, such as a laptop, a smartphone, a tablet computer, or the like. In such embodiments, the separate electronic device may also embody the user interface 270 such that the user interface 270 and the monitor 114 are embodied by the same electronic device. The separate electronic device may be configured to communicate with other devices (e.g., the hub 30) over a wired or wireless communication interface as indicated in FIGS. 23 and 24.

In some embodiments, the display device 266 and the camera 18 are capable of providing high definition images. Furthermore, in some embodiments, the monitor 114 includes a WiFi hub (i.e., a wireless communication device 178) to allow for wireless communication between the monitor 114 and the hub 30. This allows for the monitor 114 to be removed from the reel 26 while continuing to have a functioning display device 266 showing images captured by the camera 18. In other embodiments, the monitor 114 may include power and data cables 172 in place of, or in addition to the wireless communication device 178. The monitor 114 may also include a memory storage device 180 or may interface with removable memory storage devices to store the image(s) or video(s) captured by the camera 18.

The user interface 270 includes a control panel (e.g., buttons, touch screen, or rotatable dial 275) for controlling the operation of one or both of the camera 18 and the display device 266. The user interface 270 may also be used to control the operation of the camera 18. For example, the user interface 270 may enable a user to control lights, take a picture, or start and stop the recording feature of the camera 18. Similarly, the user interface 270 may be used to navigate through software programs on the display device 266. For example, the user may be able to stop or restart the distance counter that tracks the end of the cable 14 as it extends through the pipe, adjust the brightness of the display device 266, or rearrange the items showing on the display device 266. As another example, the user may be able to use the rotatable dial 275 to select a graphical user interface component (e.g., graphical user interface component 2510a in FIG. 25, graphical user interface component 2810 in FIG. 28, etc.) and adjust the value of the graphical user interface component 2510a, 2810, etc. by rotating rotatable dial 275.

Additionally, in some embodiments, the user interface 270 enables a user to "flag" certain troublesome areas of the pipe, or make notes about the condition of the pipe as the camera 18 is pushed through the pipe. For example, in some embodiments, the user interface 270 includes a keyboard and/or a microphone, which allows a user to make notes on what the camera 18 is displaying via the display device 266. A user may be able to use the microphone to make "voiceover" comments on the video. Similarly, the keyboard may enable the user to type in comments that pop up on the video images.

Furthermore, in some embodiments, an electronic processor 192 (including a memory that is configured to store instructions that are executable by the electronic processor 192) of the monitor 114 may be capable of manipulating the video recorded by the camera 18. In other embodiments, the electronic processor 192 may be part of the hub 30 or may be part of a separate computing system in communication with the hub 30 and/or the monitor 114. For example, the electronic processor 192 can create a compressed highlight reel showing only the portions of the video (or the pictures) that were flagged by a user or include a comment (i.e., voiceover comment or typed comment). The highlight reel skips over the portions of the video or the picture that are not deemed relevant by the user or may not need attention, and instead, compresses the video into a shorter video that only shows the more relevant areas of the pipe under inspection.

The videos can often be long or include lengthy portions of video clips that are not of interest to a user. In addition, while high definition images and video offer some advantages, such as the clarity of image and ability to zoom in on a point of interest, high definition video increases the file size of the videos and requires more storage space on the memory 274. Therefore, in some embodiments, the electronic processor 192 creates a shorter video showing only the points of interest. As a pipe inspection is taking place, points of interest or "highlights" are documented with captured images (which are also stored), text labels and audio clips.

After the original video is created, a second video, the "highlights reel", can be created either with input from the user or automatically. The video is reduced in file size and length by removing the portions of the video that are less important to the viewer. In some embodiments, a user may set a minimum or a maximum file size or footage length for the highlights reel. For example, a user may set the maximum file size to a size that can be emailed. The electronic processor 192 can determine how many seconds of each point of interest to show in order to keep the highlight reel within a certain file size or length. Furthermore, in some embodiments, the electronic processor 192 includes some of the video frames between each highlight in order to show continuity of the video. The electronic processor 192 could decide how often to insert a frame of video between each highlight while still remaining with the designated file size. At any point during the highlight reel, the user can pause the video and inspect the frame as well as zoom in to take a closer look at the pipe. The user can then continue watching the video when desired. In some embodiments, the portion of the video that is not used for the highlights reel is discarded.

In the illustrated embodiment, the monitor 114 includes a second battery 174a that is separate from the battery 174 housed in the hub 30. In some embodiments, the pipeline inspection device 10 includes a bi-directional power transfer between the battery 174a on the monitor 114 and the battery 174 on the hub 30, such that the battery 174 in the hub 30 and the battery 174a in the monitor 114 can be used interchangeably. In other words, when the battery 174 in the hub 30 runs out of power, the battery 174a in the monitor 114 can be used as a back up to power both the monitor 114 and the drum 34. Likewise, when the battery 174a in the monitor 114 runs out of power, the battery 174 in the hub 30 can be used to power both the monitor 114 and the drum 34. In some embodiments, a USB-C cord can be used to connect either the monitor 114 or the hub 30 to the opposite battery 174, 174a. In some embodiments, one of the batteries 174 can be charged through the other battery 174 using a USB-C cord, a cable, or through inductive flow, and visa versa. The charging can be continued until the batteries 174 have equal power and can thus remain powered for the same amount of time.

The electrical and mechanical components of the pipeline inspection device 10 can be arranged in different manners, some including wired connections and some wireless connections. Example embodiments of a wired connection and a wireless connection are provided below. However, in other embodiments, some components communicate wirelessly while others include a direct wired connection.

As shown in FIG. 23, in one embodiment, in order to power the camera 18 and deliver a signal from the camera 18 to a display device 266, power and data cables 172 are connected to the camera 18 and accompany the cable 14 down the sewer. The power and data cables 172 may freely extend side-by-side with the cable 14 or be contained within an outer sheath by or with the cable 14. The battery 174 and video processor 170 are fixedly attached to the hub 30 so as to be rotationally stationary relative to the stand 38. The power and data cables 172 are electrically connected to the hub 30 (e.g., the battery 174 and the video processor 170 hub 30) to provide power to the camera 18 and provide a data signal from the camera 18 to the video processor 170, respectively. However, in order to maintain an electrical connection between the camera 18, the video processor 170, and the battery 174, without twisting the wire connection therebetween, the power and data cables 172 are electrically connected to the battery 174 and the hub 30 by the slip ring 130 connection. The slip ring 130 connection allows for transmission of electrical signals from the power and data cables 172 to the battery 174 and other electrical components in the hub 30, while allowing the drum 34 to rotate relative to the reel 26. In the illustrated embodiment, the monitor 114 is powered by a separate battery from the battery 174 in the hub 30. However, in some embodiments, the monitor 114 is connected by a wired connection to the battery 174 in the hub 30. Also, as previously mentioned, the battery 174 in the hub 30 and the battery in the monitor 114 may be used to power one or both of the hub 30 and the monitor 114 when the opposite battery 174 is out of power. The batteries 174 may each be rechargeable and may be configured to be interchangeably used with other battery 174 powered devices (e.g., power tools).

As shown in FIG. 24, in other embodiments, the battery 174 and the video processor 170 are fixedly attached to the hub 30 and communicate wirelessly to the camera 18 and the monitor 114. For example, in one embodiment, the hub 30, including the video processor 170 and the battery 174, is fixedly attached to the drum 34, and thus rotates with the drum 34 as the cable 14 is spooled and unspooled. This eliminates the need for the slip ring 130. In addition, the wired connection between the hub 30 and the monitor 114 can be replaced with a wireless connection (e.g., Wi-Fi, Bluetooth, etc.) between the video processor 170 and the monitor 114. The hub 30 may contain a wireless communication device 178 for establishing the wireless connection to wirelessly communicate with the monitor 114 and the user interface 270 (if the user interface 270 is a separate unit). The user interface 270 for controlling functions of the camera 18 may be built into the monitor 114 (i.e., a touchscreen or a control panel of the monitor 114), or may communicate wirelessly to the monitor 114 and/or the camera 18. For example, the user interface 270 may be a Wi-Fi enabled smart device that has a software application including a user interface for controlling the camera 18. In some embodiments, the monitor 114 may be an external smart device including the display device 266 and the user interface 270 that may include a touchscreen that acts as both the display screen and the user interface 270. For example, the monitor 114 may include a smart phone, an electronic tablet, a laptop computer, or the like.

In operation, the camera 18 and the cable 14 are fed into the sewer pipeline via the access port by a user. The camera 18 is snaked from the access port through the sewer to the point of interest (e.g., obstruction, blockage, etc.) while the camera 18 sends data signals to the video processor 170 in the hub 30 that are then processed and sent to the monitor 114 to be viewed on the display device 266 by the user.

When the camera 18 reaches the area of interest, the user may physically locate the camera 18 at that location from above ground so that, for example, the user may dig at that spot to access that portion of the sewer pipeline. Accordingly, in some embodiments, the pipeline inspection device 10 includes a locator device 22 to help locate the end of the cable 14 at the location of the camera 18. Alternatively, the camera 18 may include a signal generating device (e.g., a sonde) that emits a point source electromagnetic field (i.e., EM field) which can be detected with a locating device by the user above ground. The device may include an oscillator, transmitter, and antenna within the camera 18. The locator receives the resulting strongest reading of the point source EM field directly above the point source (i.e., the camera 18). However, due to the field being only emitted as a point source originating from the camera 18, it may be difficult for a user to locate. The pipeline may be plastic, metallic, or another similar material.

In some embodiments, the pipeline inspection device 10 may include a signal generating device or transmitter having a first, outgoing electrical cable and a second, return electrical cable. In some embodiments, the transmitter may be a separate device from the pipeline inspection device 10. The transmitter further includes an oscillator and amplifier to generate an alternating electrical signal through the first electrical cable. The signal is returned through the second electrical cable (ground or return path) resulting in current that generates an EM field around the signal path (i.e., along the first and second cable). The oscillator can generate a multitude of frequencies from below approximately 1 KHz to approximately 100 KHz. The user may select a frequency that overcomes conditions present within the buried pipeline, such as pipe conductivity and length, wet or dry ground conditions, etc.

In some embodiments, the cable 14 may include a circuit consisting of the first and second electrical cables of the transmitter extending along the length of the cable 14, such that the alternating electrical signal is transmitted along the cable 14. Accordingly, the alternating signal generates the EM field along the entire path of the cable 14. The EM field can be detected by the user with a locator along the entire length and path of the cable 14 (regardless of the material from which the sewer pipeline is constructed, e.g., metal, plastic, etc.). Effectively, the first and second electrical cables create an antenna that emits the EM field. The locator detects the resulting EM field directly above ground, giving the user pipe position data (e.g., depth, etc.). Since the EM field is detectable with the locator along the entire length of the cable 14, the user may easily follow the EM field (i.e., the cable 14) directly to the location above the camera 18. The locator includes an antenna and receiver that can obtain vector information of the EM field (i.e., both magnitude (signal strength) and signal direction). With this data the user can determine the location of the source of the EM field.

As explained previously herein, in some embodiments, the camera 18 is configured to capture an image (e.g., a single image or a series of images also referred to as a video) of the inside of the pipe/conduit. Also as explained previously herein, the monitor 114 may be configured to receive the captured image and display the image on the display device 266 of the monitor 114 for viewing by a user. For example, the user may view the image to attempt to identify damage to the conduit or a cause of a clog in the conduit. However, due to different situations in which the pipeline inspection device 10 may be used, different image settings may be desirable to display the image at a desired image quality. For example, one or more of lighting near the camera 18, a type of material of the conduit, a diameter of the conduit, a target viewing distance from the camera 18, and the like may affect the image quality of the image being displayed to the user. Accordingly, it may be beneficial to display the image according to different image settings based on at least one of the above-noted application characteristics such that different applications of the pipeline inspection device 10 (e.g., when the device 10 is being used in different types of conduit) display the image captured by the camera 18 according to different image settings (e.g., hue, brightness, contrast, saturation, focal distance of the camera 18, and/or the like). Embodiments of the present disclosure allow for such beneficial display of images captured by the camera 18. Embodiments of the present disclosure improve the viewability of images displayed to the user, thus allowing for improved user experience. Additionally, embodiments of the present disclosure further improve the user experience by enhancing the ability of the user to easily adjust numerous image settings (i) by selecting characteristics of the application in which the device 10 will be used and/or (ii) by using a single input device (e.g., rotatable dial 275, a graphical user interface component such as a slider on a touchscreen, or the like) to allow the user to manually adjust multiple image settings simultaneously, but not necessarily proportionately.

Figure 25:
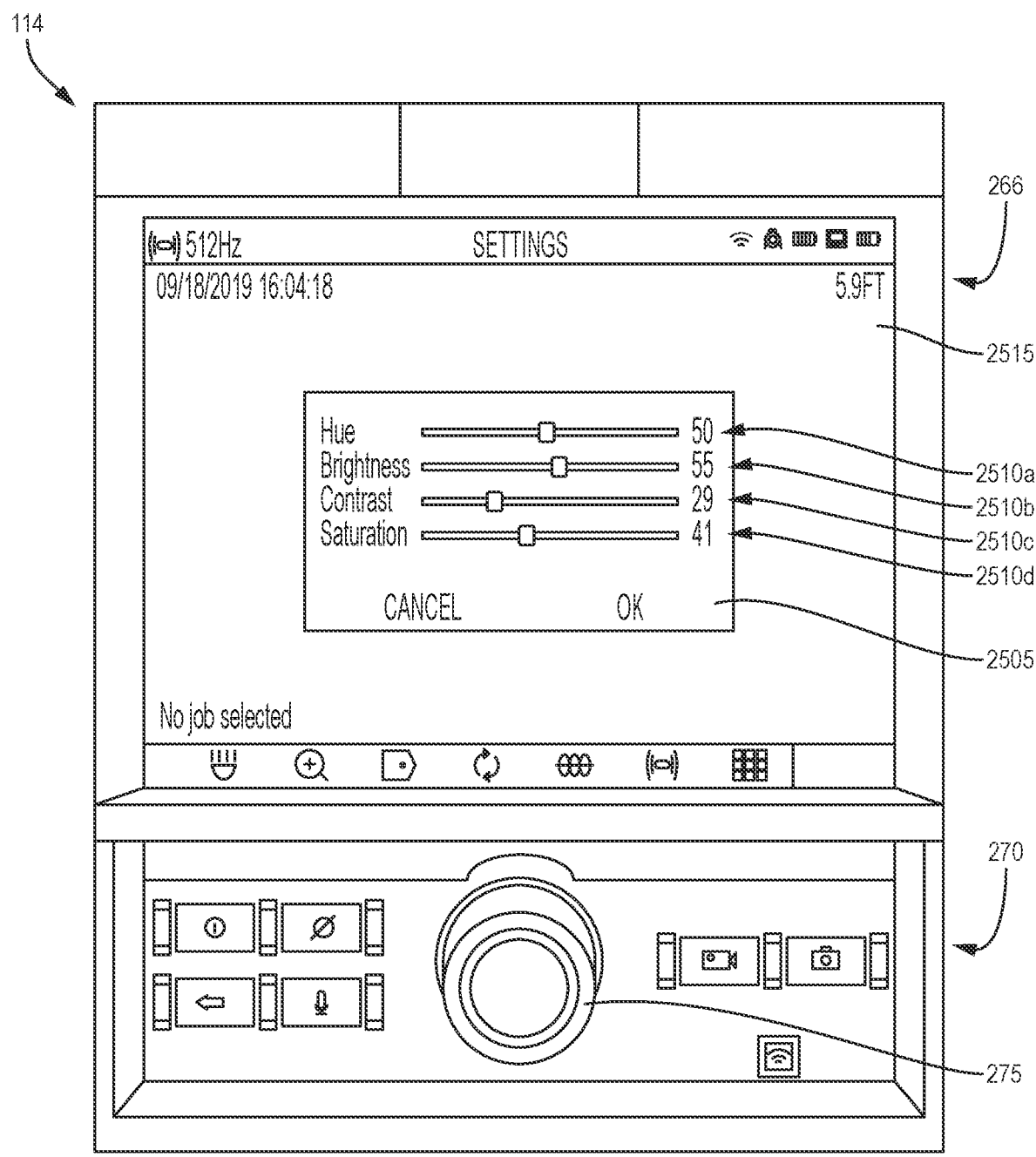
FIG. 25 illustrates a graphical user interface displayed on a display of the monitor of FIG. 21 according to one example embodiment.

As shown in FIG. 25, in some embodiments, the monitor 114 is configured to display an indication of a value of one or more image settings on the display 266. For example, the display 266 includes a textbox 2505 that includes graphical user interface components 2510*a* through 2510*d* (e.g., sliders) for each image setting that indicate a value of each image setting on a scale of, for example, zero to one hundred. In some embodiments, each of the values may be independently adjustable by the user via the monitor 114 receiving a user input via the control panel, via the display 266 (e.g., when the display 266 is a touchscreen), or via a user input received on an external device and transmitted to the monitor 114. In some embodiments, the graphical user interface components 2510*a* through 2510*d* are updated on the display 266 to indicate adjusted values of the image settings as the values are independently adjusted in response to one or more user inputs. Additionally, the electronic processor 192 of the monitor 114 controls the monitor 114 to display an image 2515 on the display 266 according to the adjusted value of the image setting. As shown in FIG. 25, the textbox 2505 is displayed simultaneously with the image 2515 captured by the camera 18 such that at least a portion of the image 2515 is viewable on the display 266 as the value of each image setting is adjusted based on different user inputs. Although the textbox 2505 is shown in FIG. 25 in the center of the display 266 and partially overlapping the image 2515, in other embodiments, the textbox 2505 and the image 2515 may be displayed in other formats such that they are simultaneously viewable on the display 266 as the value of each image setting is adjusted based on one or more user inputs. For example, the image 2515 may be displayed on a top portion of the display 266 that does not overlap with a bottom portion of the display 266 where the textbox 2505 is displayed. While FIG. 25 shows the graphical user interface components 2510*a* through 2510*d* as corresponding to the image settings of hue, brightness, contrast, and saturation, in other embodiments, the display 266 may display more or fewer graphical user interface components 2510 that correspond to subsets of the image settings or to different image settings.

Figure 26:
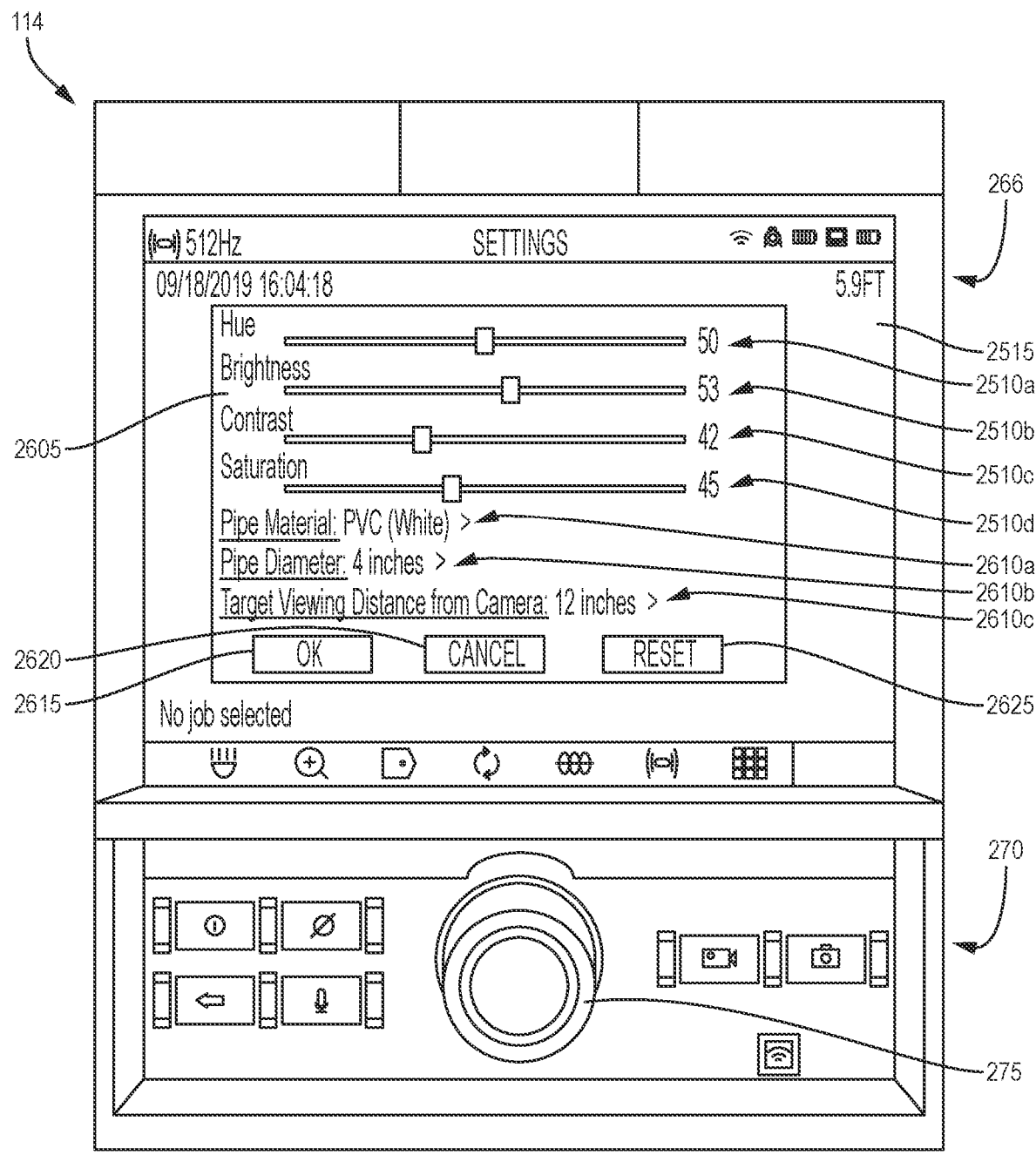
FIG. 26 illustrates another graphical user interface displayed on the display of the monitor of FIG. 21 according to another example embodiment.

In some embodiments, the monitor 114 provides a user interface in FIG. 26 that aids the user in selecting one or more recommended image settings for displaying the image on the display 266 based on one or more different characteristics of the application in which the pipeline inspection device 10 will be used or is being used. For example, a textbox 2605 includes parameter assist blocks 2610*a*, 2610*b*, and 2610*c* where the user may respectively select/enter one or more different characteristics of the application in which the pipeline inspection device 10 will be used or is being used (e.g., by selecting the arrow to the right of each parameter assist block 2610*a* through 2610*c*). In some embodiments, a pipe material parameter assist block 2610*a* allows the user to select a type of the conduit/pipe (i.e., a type of material of the pipe/conduit) into which the cable 14 is/will be inserted (e.g., white polyvinyl chloride (PVC) pipe, gray PVC pipe, clay pipe, cast iron pipe, and the like). In some embodiments, a pipe diameter parameter assist block 2610*b* allows the user to enter a diameter of the pipe/conduit into which the cable 14 is/will be inserted. In some embodiments, a target viewing distance parameter assist block 2610*c* allows the user to enter a target viewing distance from the camera 18 that is desired to be viewed by the user.

In some embodiments, when one of the parameter assist blocks 2610*a* through 2610*c* is selected, a drop-down menu is displayed on the display 266 to provide the user with a plurality of characteristics that may be selected by the user via a user input. In some embodiments, the user may be able to select a characteristic from a plurality of characteristics of one or more parameter assist blocks 2610*a* through 2610*c* in other manners.

In response to one or more characteristics of one or more particular parameter assist blocks 2610*a* through 2610*c* being selected, the electronic processor 192 may generate recommended image settings based on the selected one or more characteristics. In other words, the electronic processor 192 may determine recommended values of the image settings and control the display 266 to adjust the corresponding graphical user interface components 2510*a* through 2510*d* to display the recommend values. In some embodiments, the electronic processor 192 may access a locally-stored or remotely-stored look-up table that provides recommended image settings based on the selected one or more characteristics. In some embodiments, the user is able to make adjustments to the recommended image settings, if desired, by interacting with the graphical user interface components 2510*a* through 2510*d* as explained previously herein. In some embodiments, the recommended image settings are determined so as to increase the likelihood that the image 2515 is displayed in a manner that is useful and viewable to the user.

In some embodiments, the electronic processor 192 does not require that characteristics be entered in every parameter assist block 2610*a* through 2610*c* shown in FIG. 26 and may provide recommended settings based on characteristics entered in one or more of the parameter assist blocks 2610*a* through 2610*c*. For example, the electronic processor 192 may receive a user input indicating a type of the conduit, determine one or more image settings of the display 266 based on the type of the conduit, and control the monitor 114 to display an image on the display 266 according to the one or more image settings. In some embodiments, the textbox 2605 may include fewer or additional parameter assist blocks 2610 based on which the electronic processor 192 determines the recommended settings. In some embodiments, the electronic processor 192 adjusts one or more of the values of the image settings 2510*a* through 2510*d* based on the selected characteristic of one or more parameter assist blocks 2610*a* through 2610*c*.

As shown in FIG. 26, the textbox 2605 also includes an "OK" button 2615, a "CANCEL" button 2620, and a "RESET" button 2625. When the user is satisfied with the image settings that have been selected, the user may select the "OK" button 2615 to remove the textbox 2605 from the display 266 such that the image 2515 may be viewed on the full display 266 in accordance with the selected image settings. If the user is not satisfied with the adjustments that have been made to the image settings, the user may select the "CANCEL" button 2620 to remove the textbox 2605 from the display 266 but revert back to displaying the image 2515 on the full display 266 according to image settings that were being used before the user entered a user input to attempt to change the image settings. If the user has manually adjusted a value of one or more of the image settings 2510*a* through 2510*d* from the recommended values of the image settings determined by the electronic processor 192 based on the selected characteristics of one or more parameter assist blocks 2610*a* through 2610*c* and desires to return the image settings 2510*a* through 2510*d* to the recommended values, the user may select the "RESET" button 2625. In response to the "RESET" button 2625 being selected, the electronic processor 192 controls the display 266 to display the recommended values of the image settings (based on the selected characteristics of the parameter assist blocks 2610*a* through 2610*c*) via the corresponding graphical user interface components 2510*a* through 2510*d*.

As is evident from the above explanation, when the pipeline inspection device 10 is used in a different, second application (e.g., a different pipe/conduit), the user may re-select characteristics of the second application to allow the electronic processor 192 to determine second recommended image settings based on the characteristics of the second application. In other words, the electronic processor 192 is configured to receive a second user input indicating a second type of the second pipe/conduit where the second type is different than the first type of the first pipe conduit from the first application. The electronic processor 192 is also configured to determine one or more second image settings of the display 266 based on the second type of the second pipe/conduit where at least one of the one or more second image settings is a different value of a same type of image setting as one or more first image settings of the first application. The electronic processor 192 is also configured to control the monitor 114 to display a second image of the second pipe/conduit on the display 266 according to the one or more second image settings.

Although the parameter assist blocks 2610*a* through 2610*c* are shown within the same textbox 2605 as the image setting graphical user interface components 2510*a* through 2510*d*, in some embodiments, the parameter assist blocks 2610*a* through 2610*c* are displayed in a separate textbox to be selected by the user. In such embodiments, after the characteristics of one or more parameter assist blocks 2610*a* through 2610*c* have been selected, the separate text box is removed from the display 266 and the textbox 2605 is displayed without the parameter assist blocks 2610a through 2610c.

Figure 27:
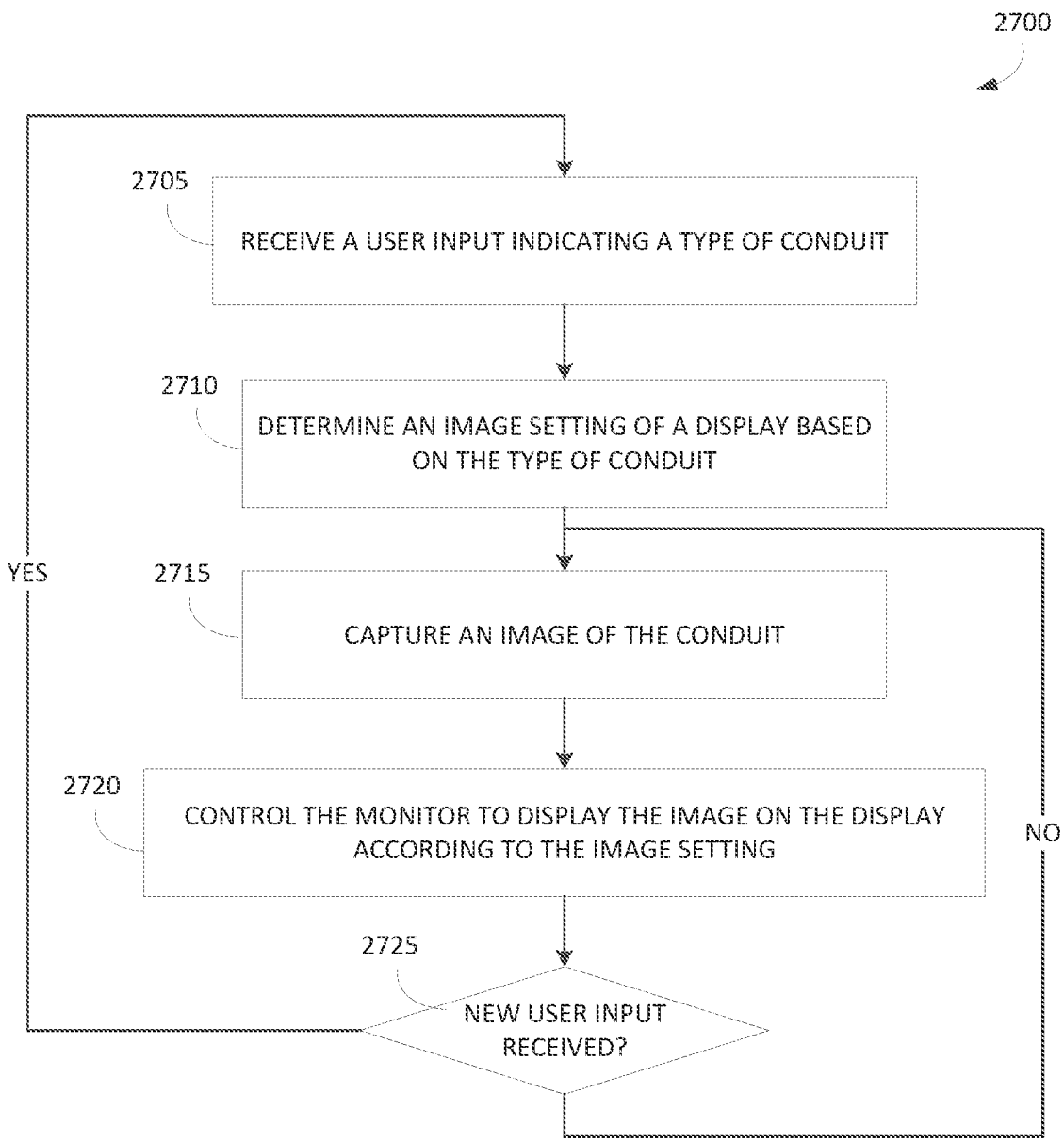
FIG. 27 is a flowchart of a method performed by an electronic processor to display a captured image of a conduit on the monitor of FIG. 21 according to one example embodiment.
Figure 29:
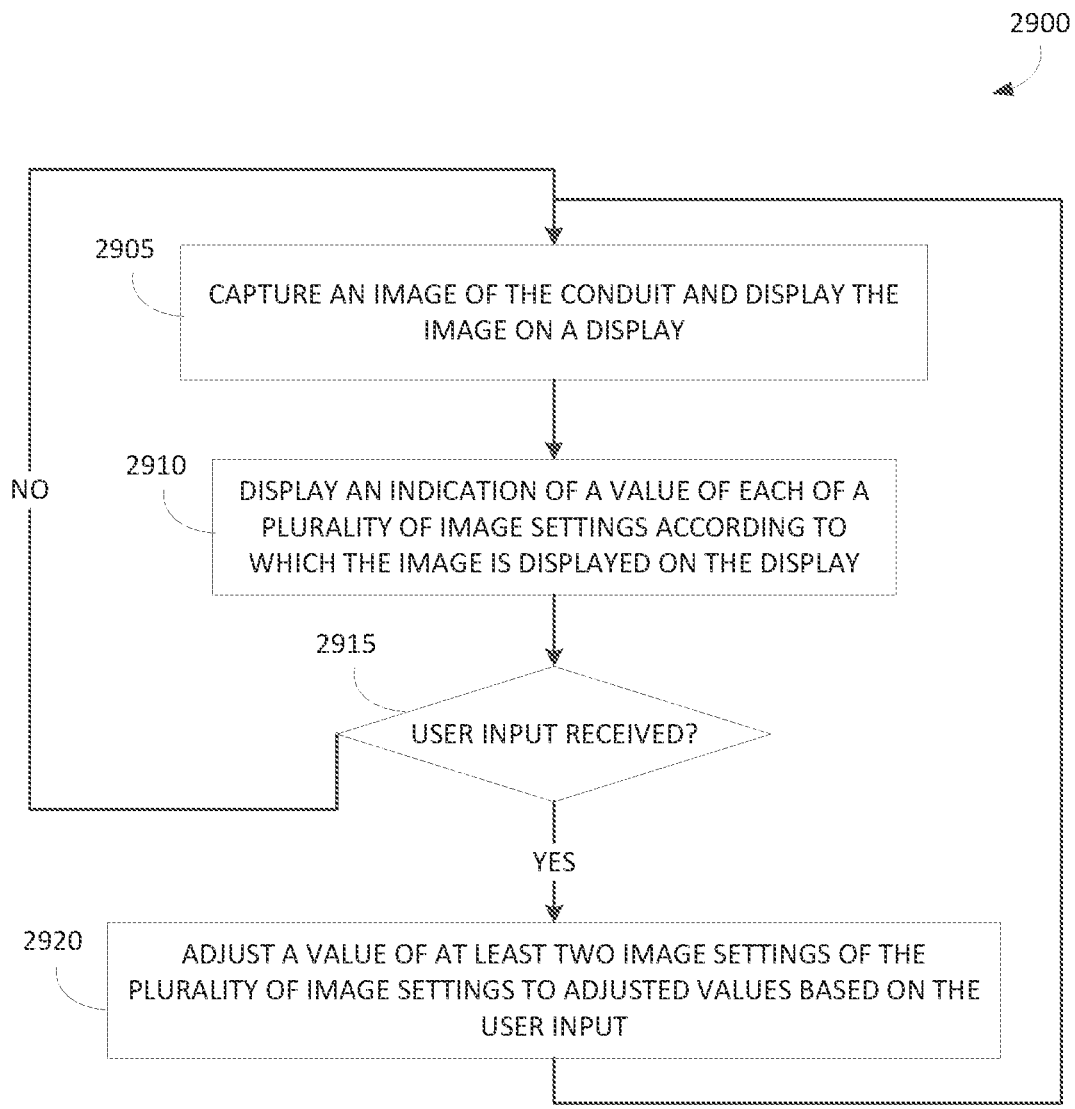
FIG. 29 is a flowchart of another method performed by an electronic processor to display a captured image of a conduit on the monitor of FIG. 21 according to another example embodiment.

FIG. 27 illustrates a method 2700 that may be executed by the electronic processor 192 according one example embodiment to display an image in accordance with recommended image settings based on the type of pipe/conduit as explained above. While a particular order of processing steps is indicated in FIGS. 27 and 29 as an example, timing and ordering of such steps may vary where appropriate without negating the purpose and advantages of the examples set forth in detail throughout the remainder of this disclosure.

At block 2705, the electronic processor 192 receives a user input indicating a type of conduit as explained previously herein. At block 2710, the electronic processor 192 determines one or more image settings of the display 266 based on the type of conduit (e.g., using a look-up table as explained previously herein). At block 2715, the electronic processor 192 captures an image of the conduit using the camera 18 as explained previously herein. At block 2720, the electronic processor 192 controls the monitor 114 to display the captured image on the display 266 according to the one or more image settings determined based on the type of conduit. At block 2725, the electronic processor 192 determines whether a new user input has been received. For example, a new user input may be received when the pipeline inspection device 10 is used for a different application (i.e., used to inspect a different pipe/conduit). When a new user input has not been received, the method 2700 proceeds to block 2715 to continue capturing images of the conduit and displaying the captured images. On the other hand, when a new user input is received (e.g., a selection of a new type of conduit), the method 2700 proceeds to block 2705 to re-execute the method 2700.

Determining recommended image settings for displaying the image 2515 on the display 266 as explained above may save the user time in manually adjusting the image settings and may allow the image 2515 to be more easily viewed by the user. For example, the recommended image settings for lighter-colored pipes such as white PVC may include higher contrast and lower saturation than the recommended image settings for darker-colored pipes such as cast iron. As another example of recommended image settings, the electronic processor 192 may determine a recommended focal distance image setting for the camera 18 based on a selected value of the target viewing distance parameter assist block 2610c. These recommended image settings are merely examples. In some embodiments, the recommended image settings may be different, and other recommended image settings are possible.

Figure 28:
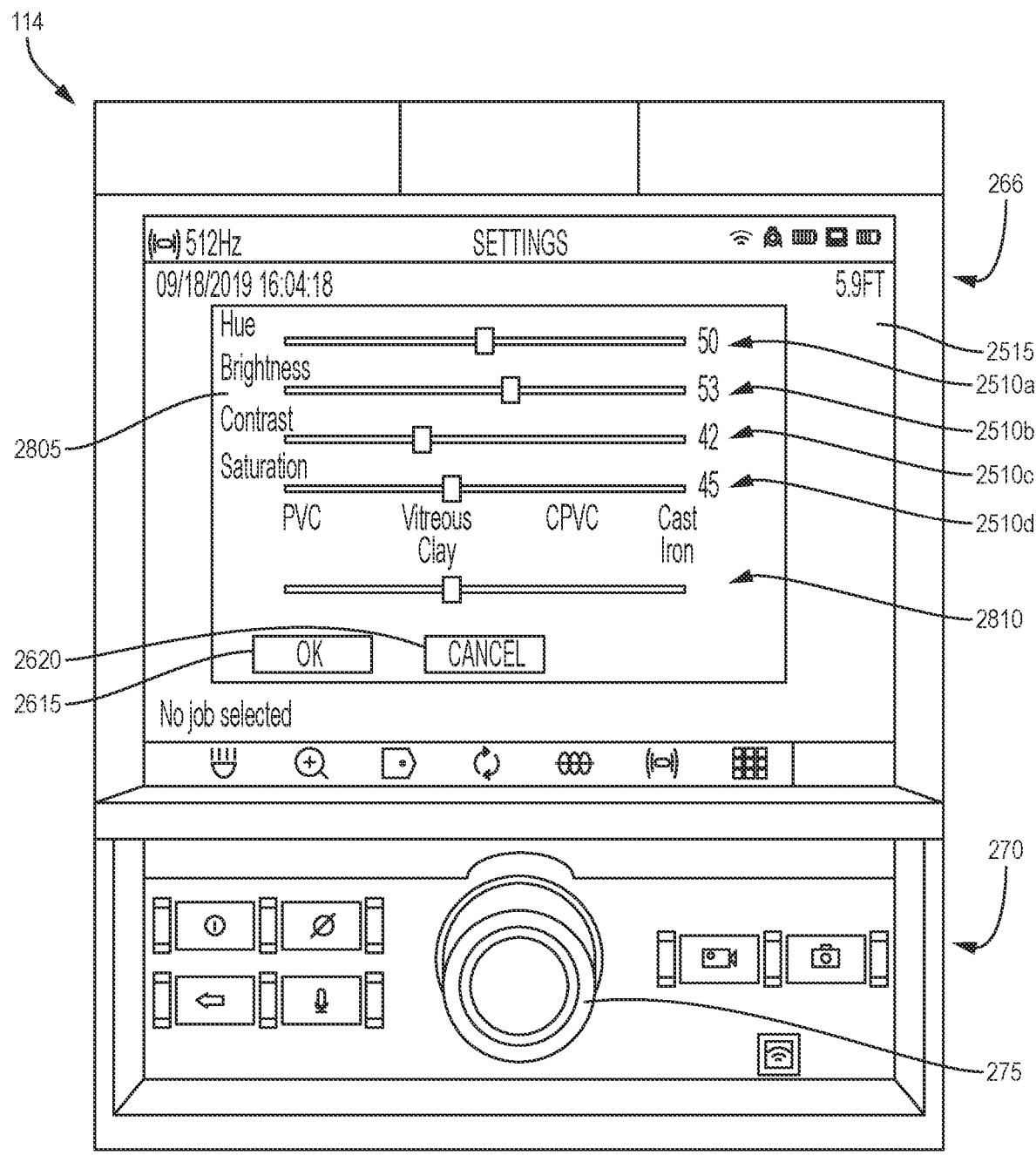
FIG. 28 illustrates another graphical user interface displayed on the display of the monitor of FIG. 21 according to one example embodiment.

FIG. 28 illustrates a graphical user interface displayed on the display 266 according to another example embodiment. As shown in FIG. 28, the graphical user interface on the display 266 is similar to the graphical user interfaces shown in FIGS. 25 and 26 and includes a textbox 2805 overlapping the image 2515. The textbox 2805 includes the image setting graphical user interface components 2510a through 2510d, the "OK" button 2615, and the "CANCEL" button 2620. The textbox 2805 also includes a combined image setting graphical user interface component 2810. In some embodiments, the combined image setting graphical user interface component 2810 allows the user to adjust a value of multiple image settings based on a single user input. In other words, the electronic processor 192 may be configured to control the monitor 114 to display an indication of a value of each image setting of a plurality of image settings 2510a through 2510d in conjunction with the graphical user interface component 2810. In response to receiving a user input via the combined image setting graphical user interface component 2810, the electronic processor 192 may adjust a value of at least two image settings of the plurality of image settings 2510a through 2510d to adjusted values based on the user input. The electronic processor 192 may also control the monitor 114 to display the image 2515 on the display 266 according to the adjusted values and may display an indication of the adjusted values on the display 266 (e.g., via the image setting graphical user interface components 2510a through 2510d).

As indicated by FIG. 28, in some embodiments, such control of the image settings 2510a through 2510d via the graphical user interface component 2810 may allow the user to gradually and simultaneously adjust multiple image settings between different recommended image settings corresponding to different types of pipe/conduit. For example, the four pipe/conduit types shown on the graphical user interface component 2810 each define values of recommended image settings depending on the type of pipe/conduit that, for example are determined using a look-up table as explained previously herein. In some embodiments, the difference in recommended image settings between each adjacent pipes/conduit of two different types (e.g., PVC and vitreous clay) may be normalized such that each image setting is proportionately adjusted as the user moves the slider 2810 from one pipe/conduit type to the next pipe/conduit type. For example, the recommended brightness setting for PVC pipe may be twenty while the recommended brightness setting for vitreous clay pipe may be forty. Continuing this example, the recommended contrast setting for PVC pipe may be sixty while the recommended contrast setting for vitreous clay pipe may be fifty. In this example, as the user moves the slider 2810 from the vitreous clay selection toward the PVC selection, the brightness setting would decrease twice as fast as the contrast setting increases because the difference between the two brightness settings is twice as much as the difference between the two contrast settings. In other words, one image setting (e.g., brightness) may be adjusted differently (e.g., decreased by two points) than another image setting (e.g., contrast being increased by one point) in response to the same user input received via the slider 2810.

Additionally, in some embodiments, the values of one or more image settings may be adjusted differently as the slider 2810 is moved between a first pipe/conduit type selection and a second pipe/conduit selection than when the slider 2810 is moved between the second pipe/conduit type selection and a third pipe/conduit type selection because the differences between the values of image settings between adjacent types of pipe/conduit on the graphical user interface component 2810 may be different than each other. For example, the values of one or more image settings may be adjusted differently as the slider 2810 is moved between the PVC selection and the vitreous clay selection than when the slider 2810 is moved between the vitreous clay selection and the CPVC selection. Continuing the above example, the recommended brightness setting for CPVC pipe may be fifty while the recommended brightness setting for vitreous clay pipe is forty as explained above. Additionally, the recommended contrast setting for CPVC pipe may be forty while the recommended contrast setting for vitreous clay pipe may be fifty as explained above. In this example, as the user moves the slider 2810 from the vitreous clay selection toward the CPVC selection, the brightness setting would increase at the same rate that the contrast setting decreases because the difference between the two brightness settings is the same as the difference between the two contrast settings. As indicated by this example movement of the slider 2810 from the vitreous clay selection to the CPVC selection compared to the example movement of the slider 2810 from the vitreous clay selection to the PVC selection, the values of one or more image settings may be adjusted differently as the slider 2810 is moved between a first pipe/conduit type selection and a second pipe/conduit type selection than when the slider 2810 is moved between (i) the second pipe/conduit type selection and a third pipe/conduit type selection and/or (ii) the third pipe/conduit/type selection and a fourth pipe/conduit type selection. This example also illustrates that the values of one image setting (e.g., brightness) may be adjusted differently (e.g., increased by one point) than the values of another image setting (e.g., contrast being decreased by one point) in response to the same user input received via the slider 2810.

The values and adjustments (i.e., increasing and/or decreasing of values) included in the above example are merely examples and are used to illustrate example differences between adjustments to values of the image settings based on a user input manipulating the graphical user interface component 2810 in accordance with some embodiments. Other values and adjustments may be used in other embodiments/situations. In some embodiments, the four pipe/conduit types shown on the graphical user interface component 2810 are arranged in order based on the similarity of their recommended image settings (e.g., from lightest color pipe/conduit to darkest color pipe/conduit). In other words, one end of the combined image setting graphical user interface component 2810 (e.g., the left end in FIG. 28) may be configured to adjust the image settings in accordance with recommended settings for a very light colored pipe/conduit (e.g., white PVC) while the other end of the graphical user interface component 2810 (e.g., the right end in FIG. 28) is configured to adjust the image settings in accordance with recommended settings for a very dark colored pipe/conduit (e.g., cast iron). In some embodiments, the graphical user interface component 2810 includes more or fewer pipe/conduit types that define the values of the recommended image settings as the user adjusts the graphical user interface component 2810. Similar to other embodiments, in some embodiments, the user may additionally individually adjust a single image setting via the graphical user interface components 2510*a* through 2510*d*.

The combined image setting graphical user interface component 2810 may allow the user to easily adjust multiple image settings with a single user input while also allowing the user to take advantage of the recommended settings determined by the electronic processor 192 based on the type of pipe/conduit. In some embodiments, the recommended image settings that define the values of the image settings at different points of the graphical user interface component 2810 are also based on one or more of the diameter of the pipe/conduit and the target viewing distance from the camera 18 as explained previously herein. In other words, the user may enter one or more characteristics of the application in which the device 10 is being used, and the electronic processor 192 may determine recommended values of image settings for each type of pipe/conduit based on the one or more characteristics, for example, using a look-up table as explained previously herein. These determined values may be used to define values of the image settings on the graphical user interface component 2810 as the user moves the slider 2810 between different types of pipe/conduit.

FIG. 29 illustrates a method 2900 that may be executed by the electronic processor 192 according one example embodiment to display an image in accordance with adjusted image settings where multiple image settings are adjusted differently based on a single user input as explained above. At block 2905, the electronic processor 192 captures an image of the conduit using the camera 18 and displays the captured image on the display 266 of the monitor 114. At block 2910, the electronic processor 192 displays an indication of a value of each of a plurality of image settings according to which the image is displayed on the display 266 as explained previously herein with respect to the FIG. 28 (e.g., displaying the graphical user interface components 2610*a* through 2610*c*). At block 2915, the electronic processor 192 determines whether a user input has been received (e.g., via the graphical user interface component 2810 as explained previously herein). When a user input has not been received, the method 2900 proceeds back to block 2905 to continue capturing images of the conduit and displaying the captured images. On the other hand, when a user input is received (e.g., via the graphical user interface component 2810 as explained previously herein), the method 2900 proceeds to block 2920. At block 2920, the electronic processor 192 adjusts a value of at least two image settings of the plurality of image settings to adjusted values based on the user input as explained previously herein with respect to the graphical user interface component 2810. The method 2900 then proceeds back to block 2905 and repeats such that, at block 2905, the captured image is displayed according to the adjusted image settings and, at block 2910, an indication of the adjusted value of each of the image settings is displayed on the display 266.

The embodiments described above and illustrated in the figures are presented by way of example only and are not intended as a limitation upon the concepts and principles of the present disclosure. As such, it will be appreciated that various changes in the elements and their configuration and arrangement are possible without departing from the spirit and scope of the present disclosure. Various features and advantages of the disclosure are set forth in the following claims.

I claim:

1. A pipeline inspection system comprising:
   a cable configured to be directed into a conduit;
   a camera disposed on a distal end of the cable and operable to capture an image;
   a monitor including a display, the monitor configured to display the image on the display; and
   an electronic device separate from the camera and the monitor, the electronic device communicatively coupled to the camera and to the monitor, the electronic device including an electronic processor configured to
   receive a user input indicating a characteristic of the conduit,
   determine an image setting of the display based on the characteristic of the conduit, and
   control the monitor to display the image on the display according to the image setting.

2. The pipeline inspection system of claim 1, wherein the image setting includes at least one of a hue setting, a brightness setting, a contrast setting, and a saturation setting; and
   wherein the characteristic of the conduit corresponds to a type of material of the conduit.

3. The pipeline inspection system of claim 1, wherein the electronic processor is configured to:

determine a plurality of image settings of the display based on the characteristic of the conduit, and control the monitor to display the image on the display according to the plurality of image settings.

4. The pipeline inspection system of claim 3, wherein the electronic device includes a second display, and wherein the electronic processor is configured to:

control the second display to display an indication of a value of each image setting of the plurality of image settings according to which the image is displayed on the display of the monitor;

receive a single user input via a combined image setting graphical user interface component on the second display of the electronic device;

simultaneously adjust a value of each of at least two image settings of the plurality of image settings to respective adjusted values based on the single user input; and control the monitor to display the image on the display of the monitor according to the respective adjusted values.

5. The pipeline inspection system of claim 1, wherein the electronic processor is configured to:

receive a second user input indicating at least one of a diameter of the conduit and a target viewing distance from the camera; and determine the image setting of the display based on the at least one of the diameter of the conduit and the target viewing distance from the camera.

6. The pipeline inspection system of claim 1, wherein the conduit includes a first conduit, wherein the image setting includes a first image setting, and wherein the cable is configured to be directed into a second conduit and the camera is operable to capture a second image, and wherein the electronic processor is configured to:

receive a second user input indicating a characteristic of the second conduit, a value of the characteristic of the second conduit being different than a value of the characteristic of the first conduit;

determine a second image setting of the display based on the characteristic of the second conduit, the second image setting being a different value of a same type of image setting as the first image setting; and control the monitor to display the second image on the display according to the second image setting.

7. The pipeline inspection system of claim 1, wherein the electronic processor is configured to:

control a second display of the electronic device to display an indication of a value of the image setting;

receive a second user input;

adjust the value of the image setting to an adjusted value based on the second user input; and control the monitor to display the image on the display according to the adjusted value of the image setting.

8. The pipeline inspection system of claim 1, wherein the electronic processor is configured to control the monitor to display the image on the display according to the image setting by transmitting, via a wired or wireless connection, a command to the monitor, wherein the command includes the image setting.

9. The pipeline inspection system of claim 1, further comprising a reel configured to house the cable, wherein the monitor is configured to be supported by the reel.

10. A pipeline inspection system comprising:

a cable configured to be directed into a conduit;

a camera disposed on a distal end of the cable and operable to capture an image; and an electronic device communicatively coupled to the camera and including a display configured to display the image on the display, the electronic device including an electronic processor configured to receive a user input indicating a characteristic of the conduit, determine an image setting of the display based on the characteristic of the conduit, and control the display to display the image on the display according to the image setting.

11. The pipeline inspection system of claim 10, wherein the image setting includes at least one of a hue setting, a brightness setting, a contrast setting, and a saturation setting; and wherein the characteristic of the conduit corresponds to a type of material of the conduit.

12. The pipeline inspection system of claim 10, wherein the electronic processor is configured to:

determine a plurality of image settings of the display based on the characteristic of the conduit, and control the display to display the image on the display according to the plurality of image settings.

13. The pipeline inspection system of claim 12, wherein the electronic processor is configured to:

control the display to display an indication of a value of each image setting of the plurality of image settings according to which the image is displayed on the display;

receive a single user input via a combined image setting graphical user interface component on the display;

simultaneously adjust a value of each of at least two image settings of the plurality of image settings to respective adjusted values based on the single user input; and control the display to display the image on the display according to the respective adjusted values.

14. The pipeline inspection system of claim 10, wherein the electronic processor is configured to receive the image via a wireless connection with a camera control device coupled to the camera.

15. The pipeline inspection system of claim 10, further comprising a reel configured to house the cable, wherein the electronic device includes a portable device that is separate from the reel.

16. The pipeline inspection system of claim 10, further comprising a reel configured to house the cable, wherein the electronic device is configured to be supported by the reel.

17. An electronic device for use with a pipeline inspection system, the electronic device comprising:

a display configured to display an image captured by a camera disposed on a distal end of a cable configured to be directed into a conduit; and an electronic processor communicatively coupled to the display, the electronic processor configured to receive a user input indicating a characteristic of the conduit, determine an image setting of the display based on the characteristic of the conduit, and control the display to display the image on the display according to the image setting.

18. The pipeline inspection system of claim 17, wherein the image setting includes at least one of a hue setting, a brightness setting, a contrast setting, and a saturation setting; and wherein the characteristic of the conduit corresponds to a type of material of the conduit.

19. The pipeline inspection system of claim 17, wherein the electronic processor is configured to:
- determine a plurality of image settings of the display based on the characteristic of the conduit, and
- control the display to display the image on the display according to the plurality of image settings.

20. The pipeline inspection system of claim 19, wherein the electronic processor is configured to:
- control the display to display an indication of a value of each image setting of the plurality of image settings according to which the image is displayed on the display;
- receive a single user input via a combined image setting graphical user interface component on the display;
- simultaneously adjust a value of each of at least two image settings of the plurality of image settings to respective adjusted values based on the single user input; and
- control the display to display the image on the display according to the respective adjusted values.

21. The electronic device of claim 17, wherein the electronic processor is configured to receive the image via a wireless connection with a camera control device coupled to the camera.

22. The electronic device of claim 17, wherein the electronic device includes a portable device that is separate from a reel, the reel configured to house the cable.

23. The electronic device of claim 17, wherein the electronic device is configured to be supported by a reel, the reel configured to house the cable.

* * * * *